United States Patent
Sakamoto et al.

(10) Patent No.: US 9,169,530 B2
(45) Date of Patent: Oct. 27, 2015

(54) ROLLED WIRE ROD AND MANUFACTURING METHOD THEREOF

(71) Applicant: NIPPON STEEL & SUMITOMO METAL CORPORATION, Tokyo (JP)

(72) Inventors: Masashi Sakamoto, Tokyo (JP); Junichi Kodama, Tokyo (JP); Akira Nishida, Tokyo (JP); Osamu Ooyama, Tokyo (JP); Yuji Tomimasu, Tokyo (JP); Kenichi Nakamura, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/372,168

(22) PCT Filed: Jan. 17, 2013

(86) PCT No.: PCT/JP2013/050777
§ 371 (c)(1),
(2) Date: Jul. 14, 2014

(87) PCT Pub. No.: WO2013/108828
PCT Pub. Date: Jul. 25, 2013

(65) Prior Publication Data
US 2015/0167112 A1    Jun. 18, 2015

(30) Foreign Application Priority Data
Jan. 20, 2012    (JP) ................. 2012-010042

(51) Int. Cl.
*C21D 8/06* (2006.01)
*C21D 9/573* (2006.01)
*C21D 9/36* (2006.01)
(Continued)

(52) U.S. Cl.
CPC ........ *C21D 9/36* (2013.01); *C21D 8/065* (2013.01); *C21D 9/525* (2013.01); *C22C 38/02* (2013.01);
(Continued)

(58) Field of Classification Search
None
See application file for complete search history.

(56) References Cited

U.S. PATENT DOCUMENTS 4,468,262 A * 8/1984 Kaneda et al. ............... 148/600
5,458,699 A * 10/1995 Tsukamoto et al. .......... 148/320
(Continued)

FOREIGN PATENT DOCUMENTS

JP    8-260046 A    10/1996
JP    9-263887 A    10/1997
(Continued)

OTHER PUBLICATIONS

International Search Report issued in PCT/JP2013/050777, mailed on Mar. 26, 2013.
(Continued)

*Primary Examiner* — Deborah Yee
(74) *Attorney, Agent, or Firm* — Birch, Stewart, Kolash & Birch, LLP

(57) ABSTRACT

A rolled wire rod includes, as a chemical component, by mass %, C: 0.95% to 1.10%, Si: 0.10% to 0.70%, Mn: 0.20% to 1.20%, and Cr: 0.90% to 1.60%, the balance consisting of Fe and unavoidable impurities, in which a metallographic structure of the rolled wire rod includes, by an area ratio, 90% to 100% of pearlite, 0% to 5% of proeutectoid cementite, and 0% to 10% of degenerate pearlite having granular cementite, an average size of a pearlite block of the pearlite is 1.0 μm to 15 μm, and a maximum size of the pearlite block is 1 to 4 times the average size.

13 Claims, 5 Drawing Sheets

(51) Int. Cl.
  *C21D 9/52* (2006.01)
  *C22C 38/32* (2006.01)
  *C22C 38/22* (2006.01)
  *C22C 38/04* (2006.01)
  *C22C 38/02* (2006.01)
  *F16C 33/32* (2006.01)
  *F16C 33/34* (2006.01)

(52) U.S. Cl.
  CPC ............... *C22C 38/04* (2013.01); *C22C 38/22* (2013.01); *C22C 38/32* (2013.01); *F16C 33/32* (2013.01); *F16C 33/34* (2013.01)

(56) References Cited

U.S. PATENT DOCUMENTS

| | | | |
|---|---|---|---|
| 8,168,011 B2 * | 5/2012 | Yamasaki et al. | 148/330 |
| 8,308,875 B2 * | 11/2012 | Yamasaki et al. | 148/330 |
| 2009/0087336 A1 | 4/2009 | Nishida et al. | |
| 2011/0284139 A1 | 11/2011 | Nishida et al. | |
| 2013/0127100 A1 | 5/2013 | Ishida et al. | |

FOREIGN PATENT DOCUMENTS

| | | |
|---|---|---|
| JP | 11-199977 A | 7/1999 |
| JP | 2001-234286 A | 8/2001 |
| JP | 2001-279382 A | 10/2001 |
| JP | 2003-129176 A | 5/2003 |
| JP | 2003-171737 A | 6/2003 |
| JP | 2004-100016 A | 4/2004 |
| JP | 6-322480 A | 8/2006 |
| JP | 2006-200039 A | 8/2006 |
| JP | 2007-224410 A | 9/2007 |
| JP | 2009-84647 A | 4/2009 |
| WO | WO 2007/139234 A1 | 12/2007 |
| WO | WO 2012/029812 A1 | 3/2012 |

OTHER PUBLICATIONS

Extended European Search Report dated Aug. 26, 2015 issued in European Patent Application No. 13738465.7.

* cited by examiner

ROLLED WIRE ROD AND MANUFACTURING METHOD THEREOF

TECHNICAL FIELD OF THE INVENTION

The present invention relates to a high-carbon steel rolled wire rod for bearings which can be wire-drawn in a hot-rolled state without performing a spheroidizing heat treatment.

Priority is claimed on Japanese Patent Application No. 2012-010042, filed on Jan. 20, 2012, the content of which is incorporated herein by reference.

RELATED ART

A high-carbon and low-alloy wire rod has been used as a material (bearing steel) for a steel ball of a ball bearing, a roller of a roller bearing, and the like. In a typical method of manufacturing the bearing steel, a spheroidizing heat treatment and the like are performed before wire-drawing. In addition, the wire-drawing is performed after the spheroidizing heat treatment. However, in a part of small-size bearing steel, breaking occurs due to work hardening caused by the wire-drawing, and thus annealing is further performed in the middle of the wire-drawing.

Bearing steel defined in JIS S 4805: 2008 (or, ISO 683-17: 1999) is hypereutectoid steel in which a C (carbon) content is equal to or more than an eutectoid point, and Cr (chromium) is added thereto. Therefore, drawability significantly decreases due to precipitation of proeutectoid cementite or martensite. Therefore, in a current state, the spheroidizing heat treatment is performed before the wire-drawing as described above. However, the spheroidizing heat treatment becomes a cause of deterioration in production efficiency and an increase in cost. Recently, there has been a demand for a high-carbon steel rolled wire rod for bearings, which is excellent in drawability in a hot-rolled state without performing the spheroidizing heat treatment for cost reduction.

With regard to a high-carbon steel wire rod excellent in drawability, Patent Document 1 discloses a steel wire rod in which the drawability is improved by defining an average grain size of ferrite to 20 μm or less and by defining the maximum grain size of ferrite to 120 μm or less. However, in Patent Document 1, the omission of spheroidizing heat treatment is not intended, and there is no technical investigation regarding an alloy composition in which a Cr content is large. According to an investigation made by the present inventors, even when the upper limit of the maximum grain size is set to 120 μm, it cannot be said that excellent drawability is obtained at all times. In addition, a manufacturing method described in Claims of Patent Document 1 is a complicated process in which cooling is performed to 630° C. or lower at a cooling rate of 15° C./sec or higher and heating is further performed. Therefore, the facility cost increases in practical manufacturing, and thus there is a concern that the steel cost increases.

Patent Document 2 discloses a steel wire rod in which the drawability is improved due to refinement of pearlite colony and an increase of proeutectoid cementite. However, according to an investigation made by the present inventors, even when the pearlite colony is refined, sufficient drawability is not considered to be obtained at all times. In addition, the gist of Patent Document 2 is to finely disperse a large amount of proeutectoid cementite. However, in an investigation made by the present inventors, when an amount of precipitation of proeutectoid cementite is excessive, a decrease in drawability is confirmed. In addition, it is confirmed that slight precipitation of proeutectoid cementite is permissible, but it is preferable that the precipitation of proeutectoid is in the least possible amount. That is, a technical idea of the present invention and a technical idea of Patent Document 2 are different from each other.

In addition, Patent Document 3 discloses a steel wire rod in which the drawability is improved by controlling a region surrounded by proeutectoid cementite to 20 μm or less. However, according to an investigation made by the present inventors, even when the region surrounded by proeutectoid cementite is made to be refined, it cannot be said that a result of improving the drawability is obtained at all times. In addition, similar to Patent Document 2, it can be seen that a technical idea of Patent Document 3 is to allow proeutectoid cementite to positively precipitate. That is, the technical idea of Patent Document 3 is different from the technical idea of the present invention.

In addition, Patent Document 4 discloses a steel wire rod in which the drawability is improved by setting an area ratio of proeutectoid cementite to 3% or more, and by setting a lamellar spacing to 0.15 μm or less. However, according to an investigation made by the present inventors, there is a problem in that when the lamellar spacing is refined, strength increases, and thus a load on a device or a die increases and the lifetime of the die is shortened.

Patent Document 5 and Patent Document 6 disclose a steel wire rod in which the drawability is improved by suppressing precipitation of proeutectoid cementite, and a manufacturing method thereof. Improvement in the drawability is reliably confirmed by suppression of the precipitation of proeutectoid cementite. However it is necessary to perform slow cooling after rapid cooling to a predetermined temperature in order to suppress an area ratio of proeutectoid cementite to 3% or less. Therefore, the facility cost increases, and thus there is a concern that the steel cost increases.

PRIOR ART DOCUMENT

Patent Document

[Patent Document 1] Japanese Unexamined Patent Application, First Publication No. 2006-200039
[Patent Document 2] Japanese Unexamined Patent Application, First Publication No. 2004-100016
[Patent Document 3] Japanese Unexamined Patent Application, First Publication No. 2003-129176
[Patent Document 4] Japanese Unexamined Patent Application, First Publication No. 2003-171737
[Patent Document 5] Japanese Unexamined Patent Application. First Publication No. H08-260046
[Patent Document 6] Japanese Unexamined Patent Application, First Publication No. 2001-234286

DISCLOSURE OF THE INVENTION

Problems to be Solved by the Invention

The present invention has been made to solve the above-described problem, and an object thereof is to provide a high-carbon steel rolled wire rod for bearings which can omit a spheroidizing heat treatment before wire-drawing and which is excellent in the drawability. In addition, an object of an aspect of the present invention is to provide a rolled wire rod that is excellent in a manufacturing cost aspect.

Means for Solving the Problem

The present inventors have made a thorough investigation about a relationship between a metallographic structure and drawability of a high-carbon steel rolled wire rod. As a result, they obtained the following findings and the like, and accomplished the invention. (A) Excessive precipitation of proeutectoid cementite decreases the drawability, but when a little amount of proeutectoid cementite is allowed to precipitate, the drawability is improved due to refinement of pearlite block, and the like. (B) If Cr is added, even when a cooling rate of a rolled wire rod is slow, the size of pearlite block is refined. (C) Not only an average value of the size of the pearlite block but also a variation in the size of the pearlite block has an effect on improvement in the drawability, and a variation in a metallographic structure such as a coarse lamellar spacing and granular cementite, strength of the rolled wire rod, and a variation in the strength, and the like also have an effect on the improvement in the drawability. (D) When a cooling rate of the rolled wire rod is reduced, and a temperature difference between areas is made to be small, the variation in the metallographic structure or strength is suppressed, and thus it is possible to further improve the drawability.

The gist of the invention is as follows.

(1) According to an aspect of the invention, there is provided a high-carbon steel rolled wire rod for bearings which includes as a chemical component, by mass %, C: 0.95% to 1.10%, Si: 0.10% to 0.70%, Mn: 0.20% to 1.20%, and Cr: 0.90% to 1.60%, the balance consisting of Fe and unavoidable impurities, in which a metallographic structure of the rolled wire rod includes, by an area ratio, 90% to 100% of pearlite, 0% to 5% of proeutectoid cementite, and 0% to 10% of degenerate pearlite having granular cementite, an average size of a pearlite block of pearlite is 1.0 μm to 15 μm and a maximum size of the pearlite block is 1 to 4 times the average size, and in which tensile strength of the rolled wire rod in a unit of MPa is equal to or less than TS1 of an upper limit of a strength shown in the following Expression 1.

$$TS1 = 1500 \times (1 - 0.5 \times \ln(D_0/5.5)) - 150 \times \exp(d_p/15 - 1) - 120 \times (\exp(A_\theta/5) - 1) - 80 \times \exp(A_p'/10 - 1)$$ (Expression 1)

Here, $D_0$ represents a wire size of the rolled wire rod in a unit of mm, $d_p$ represents the average size of the pearlite block in a unit of μm, $A_\theta$ represents an area ratio of the proeutectoid cementite, and $A_p'$ represents an area ratio of the degenerate pearlite in a unit of %.

(2) In the rolled wire rod according to (1), the chemical component may further includes by mass %, any one kind or both kinds of Mo: more than 0% and equal to or less than 0.25%, and B: more than 0% and equal to or less than 0.0025%.

(3) In the rolled wire rod according to (1) or (2), a maximum value of a size perpendicular to a longitudinal direction of the proeutectoid cementite may be 1.5 μm or less.

(4) In the rolled wire rod according to any one of (1) to (3), when a radius of the rolled wire rod in a cross section perpendicular to the longitudinal direction is set to r in a unit of mm, on an inner side of a region surrounded by ½ r from the center of the cross section, a coarse lamellar in which a lamellar spacing is 0.5 μm or more may be 0% to 10% in the pearlite by an area ratio.

(5) in the rolled wire rod according to any one of (1) to (4), a variation in the tensile strength of the rolled wire rod may be in a range of −150 MPa to +150 MPa with the average value of the tensile strength set as a reference.

(6) According to another aspect of the invention, there is provided a method of manufacturing a high-carbon steel rolled wire rod for bearings, the method includes a finish rolling process of shaping a rolled wire rod by using steel having the chemical component according to (1) or (2) at a starting temperature of a finish rolling set to 700° C. to 850° C., a coiling process of coiling the rolled wire rod in a ring shape at a coiling temperature set to 650° C. to 850° C. after the shaping of the rolled wire rod, and a cooling process of cooling the rolled wire rod to a temperature range of 500° C. to 600° C. at a cooling rate of 0.5° C./sec to 3° C./sec after the coiling of the rolled wire rod, in which when a temperature of a not-dense area at which ring overlapping of the rolled wire rod during the cooling of the rolled wire rod is less is set to Tn in a unit of ° C., and a temperature of a dense area at which the ring overlapping is much is set to Td. Td/Tn<1.20 is satisfied.

Effects of the Invention

According to the aspects of the present invention, it is possible to provide a rolled wire rod having excellent drawability in a rolled state by appropriately controlling a pearlite block size, proeutectoid cementite, degenerate pearlite, and the like. Accordingly, a spheroidizing heat treatment before wire-drawing, and annealing in the middle of the wire-drawing which is performed as necessary can be omitted. As a result, effects such as improvement in productivity and reduction in cost are obtained, and thus there is a big contribution to the society.

EMBODIMENTS OF THE INVENTION

Figure 1:
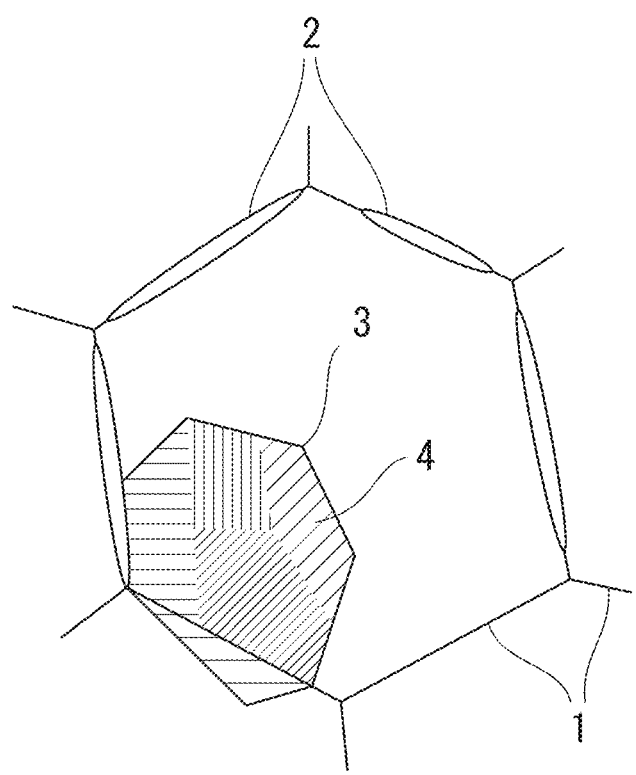
FIG. 1 is a schematic view illustrating a metallographic structure of a high-carbon steel rolled wire rod for bearings according to an embodiment of the present invention.

Hereinafter, a preferred embodiment of the present invention will be described. However, the present invention is not limited to a configuration disclosed in the embodiment and various modifications can be made in a range not departing from the gist of the present invention.

First, numerical limitation ranges with respect to a steel composition (chemical composition) of the high-carbon steel rolled wire rod for bearings according to the embodiment, and the reason for the limitation will be described. In the following description, a unit represents mass %.

C: 0.95% to 1.10%

C (carbon) is an essential element that gives the strength which is necessary for steel. Accordingly, 0.95% or more of C is added. When the C content is less than 0.95%, there is a concern that strength and fatigue properties of final products as bearings may not be satisfied. On the other hand, when the C content is more than 1.10%, it is difficult to suppress precipitation of proeutectoid cementite during cooling after hot rolling, and thus drawability deteriorates. In addition, it is preferable that the upper limit of the C content be set to 1.05% for optimal exhibition of the above-described effect.

Si: 0.10% to 0.70%

Si (silicon) is an element that is useful as a deoxidizer, and is an element that has an effect of suppressing precipitation of proeutectoid cementite even in the same carbon content. In addition, Si is a useful element that acts to increase the strength of ferrite in pearlite. So as to be effectively exhibited of this action, 0.10% or more of Si is added. However, if the Si is excessively added, there is a concern that $SiO_2$ based inclusions which are harmful for drawability are generated and thus the drawability may decrease. Therefore, the upper limit of the Si content is set to 0.70%. In addition, it is preferable that the lower limit of the Si content be set to 0.15% for optimal exhibition of the above-described effect. In addition, it is preferable that the upper limit of the Si content be set to 0.5%.

Mn: 0.20% to 1.20%

Mn (manganese) is an element that is useful for deoxidization and desulfurization, and is also useful for securement of hardenability of steel. 0.20% or more of Mn is added for effective exhibition of this action. In addition, when the Mn content is less than 0.20%, there is a concern that the deoxidization is not sufficient and oxides precipitate, and thus the drawability may decrease. On the other hand, even when being excessively added, the above-described effect is saturated, and is useless in an economic aspect. In addition, a supercooled structure such as martensite, which is harmful for the drawability, tends to be generated during cooling after hot rolling. Therefore, the upper limit of the Mn content is set to 1.20%. In addition, it is preferable that the upper limit of the Mn content be set to 1.0% for optimal exhibition of the above-described effect.

Cr: 0.90% to 1.60%

Cr (chromium) is an element that has an effect of suppressing coarsening of a pearlite block during slow cooling after hot rolling for manufacturing the rolled wire rod. Accordingly, Cr improves the drawability of the rolled wire rod that is hot rolled. In addition, Cr is a very effective element for improvement of hardenability of bearing steel that is a rolled wire rod after wire-drawing, also, for promotion of spheroidizing of carbides and for an increase in an amount of carbides. Accordingly, Cr improves fatigue properties of a bearing as a final product. However, when the Cr content is less than 0.90%, the above-described effect is not sufficiently obtained. On the other hand, when the Cr content is more than 1.60%, the hardenability becomes excessive, and thus a supercooled structure such as bainite and martensite tends to be generated during cooling after the hot rolling. Accordingly, the upper limit of the Cr content is set to 1.60%. In addition, it is preferable that the lower limit of the Cr content be set to 1.3% for optimal exhibition of the above-described effect. In addition, it is preferable that the upper limit of the Cr content be set to 1.5%.

The high-carbon steel rolled wire rod for bearings according to this embodiment contains unavoidable impurities in addition to the base components as above described. Here, the unavoidable impurities represent an auxiliary raw material such as scrap and elements such as P, S, N, O, Cd, Zn, and Sb that are unavoidably mixed in steel during manufacturing. Among these elements, P and S may be limited as follows so as to preferably exhibit the above-described effect. Hereinafter, a unit represents mass %.

P: 0.020% or Less

P (phosphorous) is an impurity. When the P content is more than 0.020%, there is a concern that P segregates at a grain boundary, and thus, the drawability may deteriorate. Therefore, it is preferable that the P content be limited to 0.020% or less. It is more preferable that the P content be limited to 0.015% or less. In addition, it is preferable that the P content be as small as possible, and thus the lower limit of the P content may be 0%. However, it is technically difficult to set the P content to 0%. In addition, when the P content is stably set to less than 0.001%, the steel making cost increases. Therefore, the lower limit of the P content may be set to 0.001%.

S: 0.020% or Less

S (sulfur) is an impurity. When the S content is more than 0.020%, there is a concern that coarse MnS is formed, and thus the drawability deteriorates. Therefore, it is preferable that the S content be limited to 0.020% or less. It is more preferable the S content be limited 0.015% or less. In addition, it is preferable that the S content be as small as possible, and thus the lower limit of the S content may be 0%. However, it is technically difficult to set the S content to 0%. In addition, when the S content is stably set to less than 0.001%, the steel making cost increases. Therefore, the lower limit of the S content may be set to 0.001%.

In the high-carbon steel rolled wire rod for bearings according to this embodiment, as a base component, the above-described steel composition (chemical components) is controlled, and the balance includes iron (Fe) and unavoidable impurities. However, the following selective elements may be included in steel as necessary in addition to the base components, that is, instead of a part of Fe in the balance.

That is, the rolled wire rod according to this embodiment may contain at least one kind of Mo and B as a selective element in addition to the base components and unavoidable impurities as described above. In the following description, a numerical limitation range of the selective element and a reason for the limitation will be described. In the following description, a unit represents mass %.

Mo: More than 0% and Equal to or Less than 0.25%

Mo (molybdenum) is a very effective element for improvement of hardenability. Accordingly, it is preferable to add Mo in an amount of more than 0%. More preferably, the lower limit of the Mo content is set to 0.1%. However, when the Mo content is more than 0.25%, hardenability becomes excessive, and thus there is a concern that a supercooled structure such as bainite and martensite tends to be generated during cooling after the hot rolling. Accordingly, the upper limit of the Mo content is set to 0.25%.

B: More than 0% and Equal to or Less than 0.0025%

B (boron) is an element which is concentrated in a grain boundary and which has an effect of suppressing generation of degenerate pearlite. Accordingly, it is preferable to add B in an amount of more than 0%. More preferably, the lower limit of the B content is set to 0.0005%. However, when B is excessively added, there is a concern that carbides such as $Fe_3(CB)_6$ are formed in austenite, and thus the drawability deteriorates. Therefore, it is preferable that the upper limit of the B content be set to 0.0025%.

Next, a metallographic structure and mechanical properties of the high-carbon steel rolled wire rod for bearings according to this embodiment will be described. In the following description, a unit relating to the metallographic structure is area %.

The high-carbon steel rolled wire rod for bearings according to this embodiment is hypereutectoid steel. In the metallographic structure of the hypereutectoid steel, as shown in FIG. 1, proeutectoid cementite 2 precipitates along a grain boundary 1 of prior austenite, and pearlite is formed on an inner side of the proeutectoid cementite 2. A region, which is called a pearlite block 3 that has the same crystal orientation of ferrite, is formed in pearlite, and a region, which is called pearlite colony 4 in which lamellar cementite is provided in parallel, is formed in the pearlite block 3.

Specifically, the pearlite block 3 is defined as a region which includes ferrite and lamellar cementite and in which a difference in a crystal orientation angle of the ferrite is less than 9°. In other words, a grain boundary of the pearlite block 3 is configured to include a boundary in which an angle difference in a crystal orientation of ferrite included in pearlite is 9° or more. In addition, the pearlite colony 4 is defined as a region which includes ferrite and lamellar cementite and in which an angle difference in a crystal orientation of the ferrite is less than 9° and the lamellar cementite is approximately parallel. In other words, the boundary of the pearlite colony 4 is configured to include a boundary in which a direction of lamellar cementite is different and a boundary in which an angle difference in a crystal orientation of ferrite included in pearlite is 9° or more.

Figure 2:
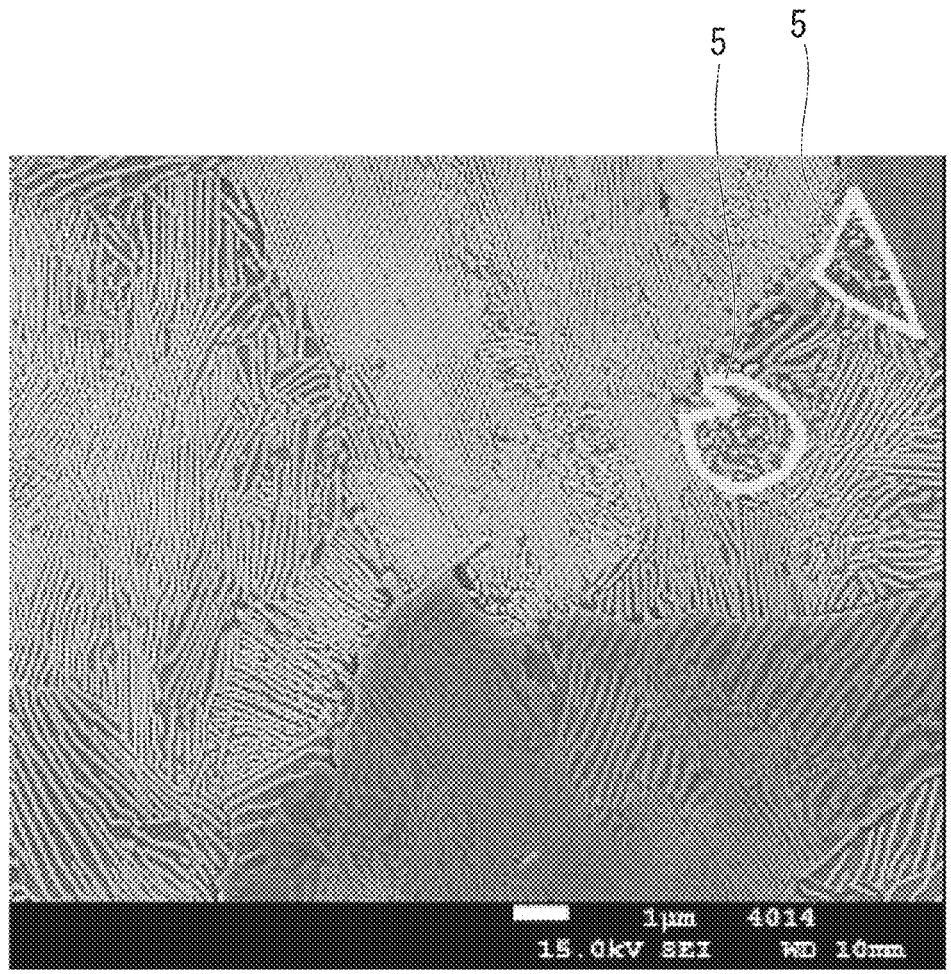
FIG. 2 is a metallographic structure photograph illustrating degenerate pearlite included in the high-carbon steel rolled wire rod for bearings according to the embodiment.

In addition, a region in which a lamellar structure collapses and cementite precipitates in a granular state may be present in pearlite. FIG. 2 is a metallographic structure photograph of the high-carbon steel rolled wire rod for bearings according to this embodiment, and in the same drawing, the region in which the lamellar structure collapses is surrounded by a white line. A region which is indicated by the white line in FIG. 2 and in which cementite does not become lamellar (layer state) and precipitates in a granular state is set as degenerate pearlite 5. Specifically, the degenerate pearlite 5 is defined as a region which includes ferrite and granular cementite and is surrounded by a boundary of a grain boundary 1 of the prior austenite, the proeutectoid cementite 2, the pearlite block 3, or the pearlite colony 4.

The metallographic structure of the high-carbon steel rolled wire rod for hearing according to this embodiment includes 90% to 100% of pearlite, 0% to 5% of proeutectoid cementite 2, and 0% to 10% of degenerate pearlite 5 having granular cementite. An average size of the pearlite block 3 of pearlite is 1.0 μm to 15 μm and a maximum size of the pearlite block 3 is 1 to 4 times the average size. Also, tensile strength of the rolled wire rod in a unit of MPa is equal to or less than TS1 of an upper limit of strength shown in the following Expression A.

$$TS1=1500\times(1-0.5\times\ln(D_0/5.5)/2)-150\times\exp((d_p/15)-1)-120\times(\exp(A_\theta/5)-1)-80\times\exp(A_p'/10-1) \quad \text{(Expression A)}$$

Here, $D_0$ represents a wire size of the rolled wire rod in a unit of mm, $d_p$ represents the average size of the pearlite block 3 in a unit of μm, $A_\theta$ represents an area ratio of the proeutectoid cementite 2 in a unit of %, and $A_p'$ represents an area ratio of the degenerate pearlite 5 in a unit of %. In addition, ln in the above Expression A represents a natural logarithm in which Napier's constant is set as the base.

Area Ratio of Pearlite: 90% to 100%

In the metallographic structure of the high-carbon steel rolled wire rod for bearings according to this embodiment, when the area ratio of pearlite is less than 90% and an area ratio of a supercooled structure such as martensite increases, a difference in an amount of plastic deformation during wire-drawing is generated between the respective structures due to a difference in strength between respective structures. As a result, unevenness in a strain is generated between the respective structures during wire-drawing, and this unevenness becomes a cause of breaking. Therefore, a main structure is set to pearlite, and an area ratio thereof is set to 90% to 100%. In addition, it is preferable that the lower limit of the area ratio of pearlite be set to 95% in order to further increase the drawability.

Area Ratio of Proeutectoid Cementite 2: 0% to 5%

Even when a small amount of proeutectoid cementite 2 precipitates, the drawability is not particularly hindered. However, when a large amount of proeutectoid cementite 2 precipitates to surround prior austenite, deformation during stretching is hindered, and thus the drawability decreases. Therefore, in the related art stated above, it is necessary for the area ratio of the proeutectoid cementite 2 to be set to 3% or less, for example. However, in the high-carbon steel rolled wire rod for bearings according to this embodiment, when the area ratio of the proeutectoid cementite 2 is set to 5% or less by controlling the chemical components, the metallographic structure and the mechanical properties in combination with each other, excellent drawability can be obtained. Accordingly, the area ratio of the proeutectoid cementite 2 is set to 0% to 5%. The smaller the area ratio of the proeutectoid cementite 2 is, the more preferable, and thus the lower limit of the area ratio of the proeutectoid cementite 2 may be 0%. However, it is technically difficult to set the area ratio of the proeutectoid cementite 2 to 0%. In addition, when the area ratio of the proeutectoid cementite 2 is stably set to 1.5% or less, it is also difficult to control the manufacturing conditions, and thus the manufacturing cost increases. Accordingly, it is preferable that the area ratio of the proeutectoid cementite 2 be set to more than 1.5% and equal to or less than 5%. It is more preferable that the area ratio of the proeutectoid cementite 2 be set to more than 3.0% and equal to or less than 5%. On the other hand, in a case where priority is given to further improvement of the drawability over the manufacturing cost, it is preferable that the area ratio of the proeutectoid cementite 2 be set to 0% to 3%.

Area Ratio of Degenerate pearlite 5: 0% to 10%

An amount of plastic deformation of the degenerate pearlite 5 including granular cementite during wire-drawing is different from that of common pearlite including lamellar cementite. As a result, unevenness in a strain is generated between respective structures during wire-drawing, and thus the drawability decreases. Therefore, the area ratio of the degenerate pearlite 5 is set to 0% to 10% in order to improve the drawability. In addition, it is preferable to set the upper limit of the area ratio of the degenerate pearlite 5 to 5% so as to further increase the drawability.

Average Size of Pearlite Block 3: 1.0 μm to 15 μm

The pearlite block 3 has very strong correlation with ductility of the high-carbon steel rolled wire rod for bearings according to this embodiment. When the pearlite block 3 is refined, the drawability is improved. To obtain this effect, an average size of the pearlite block 3 is set to 1.0 μm to 15 μm. In addition, industrially, it is practically difficult to set the average size of the pearlite block 3 to less than 1.0 μm. In addition, it is preferable that the upper limit of the average size of the pearlite block 3 be set to 12 μm so as to further increase the drawability. Most preferably, the upper limit of the average size of the pearlite block 3 is set to 10 μm.

Maximum Size of Pearlite Block 3: 1 to 4 Times Average Size

In addition, even when the average size of the pearlite block 3 is refined in the above-described range, if a variation in a block size of the pearlite block 3 is large, a strain during wire-drawing becomes uneven between respective pearlite blocks 3, and thus the drawability decreases. Therefore, in addition to the above-described refinement of the average size of the pearlite block 3, it is necessary to reduce a variation in the block size of the pearlite block 3 in order to stably improve the drawability. Specifically, even when the average size is 15 μm or less, in steel including the pearlite block 3 having the maximum size that is more than 4 times the average size, the ductility is not sufficiently secured, and thus sufficient drawability is not obtained. Therefore, the maximum size of the pearlite block 3 is set to be 1 to 4 times the average size. When the maximum size is stably set to be less than 2 times the average size, a control of manufacturing conditions becomes difficult, and thus the manufacturing cost increases. Therefore, it is preferable that the maximum size of the pearlite block 3 be set to be 2 or more times the average size. On the other hand, it is preferable that the maximum size of the pearlite block 3 is set to be 3 or less times the average size so as to further increase the drawability.

TS1 is an Upper-Limit Strength of Tensile Strength.

Generally, along with an increase in strength, the drawability decreases, and the lifetime of a die for wire-drawing is reduced. Therefore, it is preferable that the tensile strength of the high-carbon steel rolled wire rod for bearings according to this embodiment be as low as possible. However, the present inventors have found that when the tensile strength is equal to or less than TS1 of the upper limit of strength that is determined by the wire size ($D_0$) of the rolled wire rod, the average size ($d_p$) of the pearlite block 3, the area ratio ($A_\theta$) of the proeutectoid cementite 2, and the area ratio ($A_p'$) of the degenerate pearlite 5, excellent drawability is obtained. That is, when the pearlite block 3 is refined, and the area ratio of the proeutectoid cementite 2 and the degenerate pearlite 5 decreases, the drawability is improved. Accordingly, even when the manufacturing conditions are not controlled in order for the tensile strength to be lower more than necessary, if the tensile strength is equal to or less than TS1 of the upper limit of strength, the wire-drawing is possible. In addition, when the wire size of the rolled wire rod is small, a deformation load applied to the middle of the rolled wire rod in which high plastic deformability is necessary during wire-drawing decreases. Accordingly, even when the tensile strength is higher in comparison to a case in which the wire size of the rolled wire rod is large, if the tensile strength is equal to or less than TS1 of the upper limit of strength, wire-drawing is possible. Accordingly, in the high-carbon steel rolled wire rod for bearings according to this embodiment, the tensile strength as mechanical properties is set to be equal to less than TS1 of the upper limit of strength expressed in the following Expression A in a unit of MPa.

$$TS1=1500\times(1-0.5\times\ln(D_0/5.5))-150\times\exp(d_p/15-1)-120\times(\exp(A_\theta/5)-1)-80\times\exp(A_p'/10-1) \quad \text{(Expression A)}$$

Here, $D_0$ represents a wire size of the rolled wire rod in a unit of mm, $d_p$ represents the average size of the pearlite block 3 in a unit of μm, $A_\theta$ represents an area ratio of the proeutectoid cementite 2 in a unit of %, and $A_p'$ represents an area ratio of the degenerate pearlite 5 in a unit of %.

In addition, the lower limit of the tensile strength is not particularly limited. However, when excessively reducing a cooling rate during manufacturing so as to decrease the tensile strength of the high-carbon steel rolled wire rod for bearings according to this embodiment, this leads to excessive precipitation of the proeutectoid cementite 2 and an increase in the area ratio of the degenerate pearlite 5, and thus the drawability decreases. It is preferable that the lower limit of the tensile strength be set to 1100 MPa or more.

A metallographic structure and mechanical properties in order to further appropriately improve the drawability will be described below.

Maximum Value of Minor Axis of Proeutectoid Cementite 2: 1.5 μm or Less

The proeutectoid cementite 2 has small plastic deformability, and thus there is a concern that the proeutectoid cementite 2 may be disconnected due to the wire-drawing and may form a void. The proeutectoid cementite 2, which is thick (has a large minor axis), forms a large void, and this void serves as fracture origin during the wire-drawing or fracture origin in a product. Therefore, in the high-carbon steel rolled wire rod for bearings according to this embodiment, it is preferable that the maximum value (maximum thickness) of the size (minor axis) perpendicular to a longitudinal direction (major axis) of the proeutectoid cementite 2 be set to 1.5 μm or less. More preferably, the maximum value of the minor axis as described above is 1.0 μm or less. Since it is preferable that the proeutectoid cementite 2 be not included, the lower limit of the maximum value of the minor axis may be 0 μm. However, it is technically difficult for the proeutectoid cementite 2 not to be included. Accordingly, the maximum value of the minor axis of the proeutectoid cementite 2 may be set to 0.1 μm or more.

Area Ratio of Coarse Lamellar: 0% to 10%

With regard to pearlite in which a lamellar spacing is coarse, there is a concern that an amount of plastic deformation during the wire-drawing may be different from that of pearlite in which the lamellar spacing is not coarse. As a result, there is a concern that unevenness in a strain between respective structures may be generated during the wire-drawing, and thus the drawability may decrease. Particularly, it is preferable that the area ratio of the pearlite in which the lamellar spacing is coarse (coarse lamellar) be smaller at the middle of the rolled wire rod in which a load during the wire-drawing is large. Therefore, in the high-carbon steel rolled wire rod for bearings according to this embodiment, when a radius of the rolled wire rod in a cross section perpendicular to the longitudinal direction is set to r in a unit of mm, it is preferable that on an inner side (the middle of the rolled wire rod) of a region surrounded by ½ r (that is, r/2) from the center of the cross section, a coarse lamellar in which a lamellar spacing is 0.5 μm or more be 0% to 10% in pearlite in the same region by an area ratio. In addition, the smaller the area ratio of the coarse lamellar at the middle is, the more preferable, and thus the lower limit of the area ratio may be 0%. In addition, it is preferable that the area ratio of the coarse lamellar at the middle be set to 5.0% or less so as to further increase the drawability. In addition, at a surface layer of the rolled wire rod which is located at a distance more than ½ r from the center of the cross section, an application of the strain during the wire-drawing is smaller in a comparison to the middle of the rolled wire rod. Accordingly, even when the coarse lamellar exceeding 10% is present at the surface layer, there is no great effect on the drawability. However, it is preferable that the area ratio of the coarse lamellar at the surface layer of the rolled wire rod be set to 10% or less.

Variation in Tensile Strength: within ±150 MPa with Average Value Set as Reference The rolled wire rod is generally coiled in a ring shape and is cooled. Although details will be described later, with regard to the rolled wire rod that is coiled in a ring shape and is cooled, a difference in density is present in a ring. Therefore, there is a concern that a temperature of a wire rod during cooling is different between a dense area and a not-dense area in the ring, and thus a variation in the tensile strength may be generated. When the variation in the tensile strength increases, there is a concern that the drawability of the rolled wire rod may decrease. Accordingly, in the high-carbon steel rolled wire rod for bearings according to this embodiment, it is preferable that the variation in the tensile strength in respective areas of a ring be set in a range of −150 MPa to +150 MPa with an average value of the tensile strength set as a reference. It is more preferable that the variation in the tensile strength in respective areas of a ring be set in a range of −100 MPa to +100 MPa with an average value of the tensile strength set as a reference.

Next, a method of measuring the above-described metallographic structure and mechanical properties of the high-carbon steel rolled wire rod for bearings according to this embodiment will be described.

Measurement of the area ratio of pearlite, the proeutectoid cementite 2, and the degenerate pearlite 5 is performed by the following method. The rolled wire rod is cut in such a manner that a cross section perpendicular to the longitudinal direction (C cross section, cross section perpendicular to a wire-drawing direction) becomes an observed section. After embedding in resin, polishing from rough polishing to alumina polishing is performed in order for the observed section to be a mirror surface. The observed section that becomes a mirror surface is subjected to corrosion with 3% nital solution and picral solution. The center area (inner side of the region surrounded by ½ r as described above) of the observed section after the corrosion is observed with a scanning electron microscope (SEM) at a magnification of 2000 times, and 10 sheets of metallographic structure photographs are taken (observation visual field: 0.02 mm$^2$). In addition, from the metallographic structure photographs of 10 visual fields, measurement of the area ratio of the pearlite, the proeutectoid cementite 2, and the degenerate pearlite 5 is performed by image analysis. In addition, the area ratio of the pearlite, the proeutectoid cementite 2, and the degenerate pearlite 5 of a surface layer (region exceeding ½ r as described above) of the observed section after corrosion is measured as necessary.

Measurement of the average size and the maximum size of the pearlite block 3 is performed by the following method. Polishing from rough polishing to polishing with colloidal silica is performed in order for the observed section to be a mirror surface. After removing a working strain of the observed section after the polishing, EBSD measurement of the center area of the observed section after corrosion is performed in a plurality of times using an Electron Back Scattering Diffraction Pattern (EBSD) under conditions in which a step size becomes 0.4 μm in such a manner that the total observation visual field becomes 50000 μm$^2$. In addition, the pearlite block 3 in the observation visual field is analyzed according to the above-described definition in order to obtain the average size and the maximum size of the pearlite block 3. In addition, measurement of the surface layer of the observed section is performed as necessary.

Measurement of the maximum value of a size (minor axis) perpendicular to the longitudinal direction of the proeutectoid cementite 2 is performed by the following method. The center area of the observed section, which is prepared by the same method as the measurement of the area ratio of the proeutectoid cementite 2, is observed at 10 visual fields at a magnification of 2000 times. At each of the visual fields, the thickest proeutectoid cementite 2 (having the largest minor axis) is observed at a magnification of 5000 times so as to measure the maximum thickness (maximum minor axis). An average value is obtained from the maximum thickness (maximum minor axis) measured at each of the 10 visual fields, and then the average value is set to the maximum value of the size (minor axis) perpendicular to the longitudinal direction of the proeutectoid cementite 2. In addition, measurement of the surface layer of the observed section is performed as necessary.

Measurement of the area ratio of the coarse lamellar is performed by the following method. The center area of the observed section, which is prepared by the same method as the measurement of the area ratio of the pearlite as described above, is observed at a magnification of 2000 times, and 10 sheets of metallographic structure photographs are taken (the total measurement visual field: 0.02 mm$^2$). In addition, from the metallographic structure photographs of 10 visual fields, measurement of the area ratio of a region (coarse lamellar) in which the lamellar spacing of the lamellar cementite in the pearlite is 0.5 μm or more is performed by image analysis. At this time, the area ratio of the coarse lamellar with respect to the pearlite included in the observation visual field is obtained. In addition, in a case where it is difficult to determine whether or not the lamellar spacing of the lamellar cementite is 0.5 μm or more because cementite is inclined in the observation visual field, the measurement is performed again at another visual field.

Measurement of the tensile strength is performed by the following method. Five rings (rolled wire rod having a length corresponding to five laps) are continuously collected from the above-described ring-like rolled wire rod, and each (rolled wire rod having a length corresponding to one lap) of the rings is divided into eight parts, and a total of 40 pieces of rolled wire rods is set as a specimen. In addition, for example, evaluation is made with a tensile test according to JIS Z 2241: 2011 (or ISO 6892-1: 2009). An average value of tensile strength is obtained from test results of the 40 pieces, and then the average value thereof is set as tensile strength of the rolled wire rod. In addition, in the maximum value or the minimum value of the test results of the 40 pieces, a value in which a difference with the average value is large is selected, and a difference with the average value is obtained. This difference is set as a variation of the tensile strength in a unit of MPa. In addition, specifically, a length of a sample in the tensile test is 200 mm, and the tensile test is performed under conditions in which a crosshead speed is set to 10 mm/min, and a distance between jigs is set to 100 mm.

Next, a method of manufacturing the high-carbon steel rolled wire rod for bearings according to an embodiment of the present invention will be described. In addition, the following manufacturing method to be described below is an example of a method of manufacturing a high-carbon steel rolled wire rod for bearings which is excellent in drawability. Accordingly, the present invention is not limited to a sequence and a method of this embodiment, and any method may be employed as long as this method can realize the configuration of the present invention.

As a casting process, molten steel having the above-described steel composition (chemical components) is casted so as to produce a cast piece. A casting method is not particularly limited, but a vacuum casting method, a continuous casting method, and the like may be used.

As a soaking process, the cast piece after the casting process is subjected to retention (a heat treatment for reducing segregation that occurs due to the casting and the like) in a temperature range of approximately 1100° C. to 1200° C. for approximately 10 hours to 20 hours as necessary.

As a blooming process, a steel piece (steel piece before wire rod rolling which is generally referred to as a billet) having a size appropriate fir wire rod rolling is produced with blooming by using the cast piece after the casting process or the soaking process as necessary.

Next, as a heating process, the steel piece is heated. Heating conditions are not particularly limited, and heating may be performed, for example, at a temperature of 900° C. to 1200° C. When the heating is performed in a temperature range of 900° C. to 1200° C., a metallographic structure of the steel piece can be appropriately controlled to an austenite single phase.

Continuously, as a hot rough rolling process, the steel piece after the heating process is subjected to rough rolling as necessary. Rough rolling conditions are not particularly limited, and the rolling may be performed under appropriately preferred conditions in accordance with a shape of the steel piece, and the like. For example, the rough rolling is performed in a temperature range of 750° C. to 1000° C. in such a manner that an accumulated reduction becomes 95% to 99%. The steel piece may become a rough rolled material having dimensions appropriate for supply to a finish rolling process that is a subsequent process by performing the rough rolling under the above-described conditions. In addition, when a metallographic structure of the rough rolled material after the rough rolling is controlled to an appropriate refined austenite grain by performing the rough rolling under the above-described conditions, the average size and the maximum size of the pearlite block 3 of the rolled wire rod can be appropriately controlled, and thus this is preferable.

Subsequently, as a finish rolling process, the steel piece after the heating process or the rough rolled material after the hot rough rolling process is shaped into a rolled wire rod with finish rolling. In the finish rolling, rolling is performed by controlling a starting temperature of finish rolling to 700° C. to 850° C. In addition, a temperature of the rolled wire rod during the finish rolling is a value measured by a radiation-type thermometer, and strictly represents a surface temperature of the rolled wire rod.

The reason for the setting of the starting temperature of finish rolling to 850° C. or lower is to make an austenite grain refined, thereby increasing a nucleation site of pearlite during transformation and making the size of the pearlite block 3 refined. When the starting temperature of finish rolling is higher than 850° C., an effect of the refinement is not sufficiently obtained. In addition, the starting temperature of finish rolling is more preferably set to 830° C. or lower, and still more preferably 800° C. or lower. In addition, when the starting temperature of finish rolling is lower than 700° C., a load of a rolling facility increases, and this leads to an increase in the facility cost or leads to deterioration in production efficiency. In addition, a surface layer of the rolled wire rod is excessively cooled, and thus there is a concern that cracking or an abnormal structure may be generated in the rolled wire rod. As a result, there is a concern that the drawability may decrease. Accordingly, the starting temperature of finish rolling is set to 700° C. or higher, and more preferably 750° C. or higher.

In addition, the accumulated reduction in the finish rolling process is not particularly limited. However, it is preferable to perform the finish rolling in such a manner that the accumulated reduction in the finish rolling process becomes 80% to 98%. When the finish rolling is performed under these conditions, it is possible to control metallographic structure of the rolled wire rod after the finish rolling to a refined austenite grain in a further appropriate manner. As a result, it is possible to control the average size and the maximum size of the pearlite block 3 in a further appropriate manner, and thus the finish rolling under the conditions is preferable.

Subsequently, as a coiling process, the rolled wire rod after the finish rolling process is coiled in a ring shape. The coiling is performed at a coiling temperature of 650° C. to 850° C. At this time, the rolled wire rod after the finish rolling process is subjected to cooling as necessary to control the temperature so as to 650° C. to 850° C. and then the resultant rolled wire rod is coiled in a ring shape.

When the temperature of the rolled wire rod becomes 850° C. or higher due to heat generation by working during finish rolling, the austenite grain that is refined due to the finish rolling grows during the coiling process and becomes coarse. When the coiling temperature is set to 850° (or lower, the coarsening is suppressed, and thus it is possible to appropriately control the average size of the pearlite block 3 of the rolled wire rod. In addition, the area ratio of pearlite can be satisfied. Therefore, the rolled wire rod after the finish rolling is cooled and the coiling temperature is set to 850° C. or lower, as necessary. To appropriately obtain the above-described effect or to reduce the maximum thickness of the proeutectoid cementite 2, it is preferable to set the coiling temperature to 840° C. or lower, and more preferably 800° C. or lower. In addition, when the coiling temperature is lower than 650° C., the rolled wire rod is hardened, and thus it is difficult to coil the rolled wire rod in a ring shape. In addition, there is a concern that cracking may be generated in the rolled wire rod. Therefore, the coiling temperature is set to 650° C. or higher, and more preferably 700° C. or higher.

Subsequently, as a cooling process, the ring-like rolled wire rod after the coiling process is subjected to control cooling. The control cooling is performed at a cooling rate of 0.5° C./sec to 3° C./sec from a finishing temperature of coiling to a temperature range of 500° C. to 600° C. In addition, when a temperature of a not-dense area in a ring of the rolled wire rod during the cooling process is set to Tn in a unit of ° C. and a temperature of a dense area in a ring is set to Td, the cooling is performed under conditions in which Td/Tn<1.20 is satisfied. In addition, specifically, the temperature Td of the dense area in the ring is measured when the temperature Tn of the not-dense area in the ring is 650° C., and the cooling is performed under conditions in which the temperature Tn of the not-dense area in the ring and the temperature Td of the dense area in the ring satisfy a relationship of Td/Tn<1.20.

During the cooling process after the coiling process, the metallographic structure of the rolled wire rod transforms from austenite to pearlite. Therefore, the cooling rate after the coiling is a factor of controlling a transformation temperature. When the cooling rate is more than 3° C./sec, pearlitic transformation during the cooling is not completed, a supercooled structure such as martensite and bainite is generated, the area ratio of pearlite decreases, and the drawability may decrease. Therefore, the cooling rate during the cooling is set to 3° C./sec or less. In addition, even in a case where the supercooled structure such as martensite is not generated, when the cooling rate increases, the transformation temperature from austenite to pearlite is practically lowered, and thus there is a concern that tensile strength of the rolled wire rod may excessively increase. Similarly, when the cooling rate increases, a temperature variation between a not-dense area and a dense area of the ring-like rolled wire rod increases, and thus a variation in the metallographic structure increases. Therefore, there is a concern that the maximum size of the pearlite block 3 may not be satisfied. More preferably, the cooling rate during the cooling may be set to 2.3° C./sec or less in order to reduce the variation in the tensile strength. On the other hand, when the cooling rate is too slow, a large amount of proeutectoid cementite 2 precipitates on the grain boundary 1 of the prior austenite, and the proeutectoid cementite 2 forms a network on the grain boundary 1 of the prior austenite. As a result, the drawability decreases. In addition, the area ratio of the degenerate pearlite 5 and the average size of the pearlite block 3 are not satisfied. Accordingly, the cooling rate is set to 0.5° C./sec or more. More preferably, the cooling rate during the cooling may be set to 0.8° C./sec or more. In addition, the rolled wire rod according to this embodiment includes Cr as described above, and thus coarsening of the pearlite block 3 is preferably suppressed.

In addition, when the control cooling is stopped at a temperature higher than 600° C., under conditions of the coiling temperature and the cooling rate, there is a concern that transformation from austenite to pearlite may not be completed. Therefore, the control cooling is performed until it reaches a temperature of 600° C. or lower. The lower limit of the stopping temperature of the control cooling is not particularly limited. However, when the control cooling is performed until it reaches a temperature lower than 500° C. there is a concern that the manufacturing cost may increase. Accordingly, the control cooling is performed from the finishing temperature of coiling to a temperature range of 500° C. to 600° C.

Figure 4:
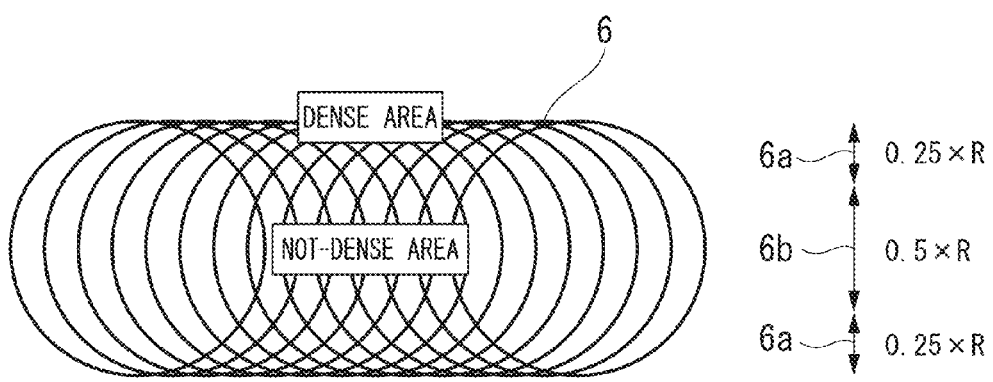
FIG. 4 is a schematic view illustrating a wire rod state during cooling after coiling the high-carbon steel rolled wire rod for bearings according to the embodiment of the present invention.

In addition, generally, in rolling of a wire rod, a rolled wire rod is coiled in a ring shape after rolling and is cooled. At this time, as shown in FIG. 4, in the rolled wire rod coiled in a ring shape, a dense area in which overlapping of the rolled wire rod is much and a not-dense area in which the overlapping is less are generated. Specifically, when an average size of the ring-like rolled wire rod 6 is set to R in a unit of m, a region indicated by an arrow 6a shown in FIG. 4 obtained when viewing the rolled wire rod 6 during the cooling process in a plan view is set as a dense area, and a region indicated by an arrow 6b is set as a not-dense area. That is, when viewing the rolled wire rod 6 during the cooling process in a plan view, a region of 0.25×R from each side edge in a width direction is set as the dense area of the ring-like rolled wire rod 6, and a region of 0.5×R at the middle in the width direction is set as the not-dense area of the ring-like rolled wire rod 6. A temperature of the rolled wire rod 6 during the cooling tends to be different between the not-dense area and the dense area. As described above, when a temperature difference occurs in the rolled wire rod 6, the drawability decreases. Even when the entirety of austenite transforms into pearlite, if a temperature difference between not-dense area and the dense area is large, there is a concern that the maximum size of the pearlite block 3 may not be satisfied. Accordingly, it is necessary for the relationship between the temperature Tn of the not-dense area in the ring and the temperature Td of the dense area in the ring to satisfy Td/Tn<1.20. More preferably, a relationship of Td/Tn<1.15 may be set to reduce a variation in the tensile strength.

In addition, in the cooling process, a method of controlling the cooling rate and a method of controlling the temperature of the not-dense area and the dense area of the ring-like rolled wire rod are not particularly limited. For example, as the method of controlling the cooling rate, an ambient temperature at which releasing heat is possible may be controlled. In addition, for example, as the method of controlling the temperature of the not-dense area and the dense area of the ring-like rolled wire rod, a ring variation is made to be large, or a step difference is applied during conveyance.

In addition, the area ratio of the proeutectoid cementite 2 may be preferably controlled in accordance with the coiling temperature during the coiling process. The average size of the pearlite block 3 may be preferably controlled in accordance with the temperature difference between the not-dense area and the dense area of the ring-like rolled wire rod 6. The tensile strength may be preferably controlled to be equal to or less than TS1 of the upper limit of strength in accordance with the starting temperature of finish rolling and the coiling temperature. The maximum thickness of the proeutectoid cementite 2 may be preferably controlled in accordance with the cooling rate during the cooling process. The area ratio of the coarse lamellar may be preferably controlled in accordance with the coiling temperature and the cooling rate. The variation in the tensile strength may be preferably controlled in accordance with the starting temperature of finish rolling and the coiling temperature.

Figure 3:
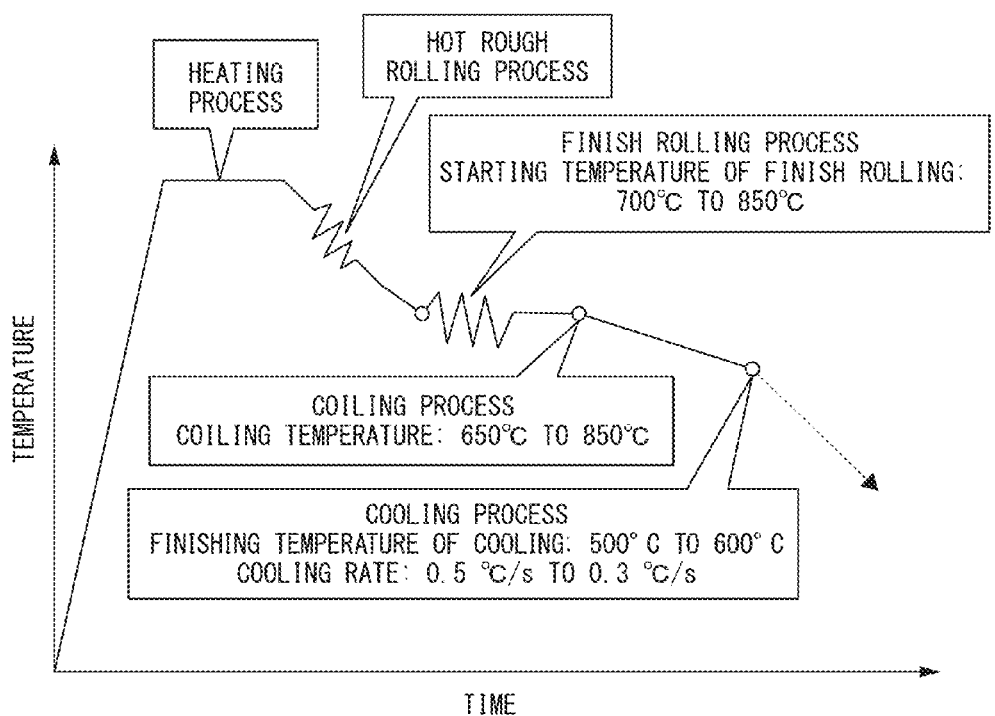
FIG. 3 is a view illustrating an example of a manufacturing pattern of the high-carbon steel rolled wire rod for bearings according to the embodiment of the present invention.

FIG. 3 illustrates an example of a manufacturing pattern of the high-carbon steel rolled wire rod for bearings according to this embodiment. The high-carbon steel rolled wire rod for bearings, which is manufactured through the respective processes, becomes a rolled wire rod having a size of 3.0 mm to 6.0 mm.

Example 1

An effect of an aspect of the present invention will be described in more detail with reference to Examples, but a condition in Examples is one conditional example that is employed to confirm the applicability and effect of the present invention and the present invention is not limited to the conditional example. The present invention may employ various conditions as long as the object of the present invention is accomplished without departing from the gist of the present invention.

A steel composition (chemical components) and manufacturing conditions are shown in Tables 1 to 4, and results obtained by evaluating a metallographic structure, mechanical properties, and drawability of the rolled wire rod are shown in Tables 5 to 8.

In this example, a billet, which was prepared by a casting process, a soaking process, and a blooming process, was subjected to heating at 1000° C. to 1200° C. in a heating furnace as a heating process. Then, as a hot rough rolling process, the resultant billet was subjected to rough rolling at a temperature range of 750° C. to 1000° C. in order for an accumulated reduction to be 95% to 99%, whereby a rough rolled material was obtained. A rolled wire rod was manufactured by using the rough rolled material under conditions of the finish rolling process, the coiling process, and the cooling process which are shown in Tables 1 to 4. In addition, the finish rolling was performed in order for the accumulation reduction in the finish rolling process to be 80% to 98%.

The metallographic structure was evaluated with the average size and the maximum size of the pearlite block, maximum size/average size, the area ratio of proeutectoid cementite, the maximum thickness (maximum value of the size perpendicular to the longitudinal direction) of proeutectoid cementite, the area ratio of degenerate pearlite, the area ratio of pearlite, and the area ratio of the coarse lamellar.

Observation of the metallographic structure and measurement of the area ratio of proeutectoid cementite, the area ratio of degenerate pearlite, the area ratio of pearlite, the maximum thickness of proeutectoid cementite and the area ratio of the coarse lamellar were performed by using a SEM. The C cross section of the rolled wire rod that was obtained was embedded in a resin, and then polishing from rough polishing to alumina polishing was performed. Then, corrosion was performed with 3% nital solution and picral solution, and then observation of the metallographic structure was performed. In addition, from the metallographic structure photographs, measurement of the area ratio was performed by image analysis.

With regard to the area ratio of proeutectoid cementite, the area ratio of degenerate pearlite, the area ratio of pearlite, and the area ratio of the coarse lamellar, an observation region was observed at a magnification of 2000 times, and 10 sheets of metallographic structure photographs were taken (the total measurement visual field: 0.02 $mm^2$), and measurement of the respective area ratios was performed by image analysis. In addition, with regard to the maximum thickness of proeutectoid cementite, at each of the 10 visual fields, the thickest proeutectoid cementite (having the largest minor axis) was observed at a magnification of 5000 times so as to measure the maximum thickness (maximum minor axis). In addition, an average value was obtained from the maximum thickness (maximum minor axis) which was measured at each of the 10 visual fields, and the average value was set as the maximum thickness of proeutectoid cementite. In addition, with regard to the area ratio of the coarse lamellar, in the center area of the observed section, an area ratio of a region (coarse lamellar) in which a lamellar spacing of lamellar cementite in pearlite was 0.5 μm or more was measured. In addition, in a case where it was difficult to determine whether or not the lamellar spacing of the lamellar cementite was 0.5 μm or more with the measurement of the area ratio of the coarse lamellar due to inclination of cementite, the measurement was performed at another visual field.

The average size and the maximum size of the pearlite block were measured using an Electron Back Scattering Diffraction Pattern (EBSD). The C cross section of the rolled wire rod which was obtained was subjected to polishing including rough polishing, alumina polishing, and polishing using colloidal silica. After removing a working strain of an observed section after the polishing, the rolled wire rod was supplied to measurement. An observation visual field was set to 50000 μm$^2$, and measurement was performed by setting a boundary in which an angle difference in a crystal orientation of ferrite included in pearlite was 9° or more as a grain boundary of the pearlite block. According to the measurement, the average size and the maximum size of the pearlite block were measured, and a ratio of maximum size/average size was calculated.

A tensile test was performed as evaluation of mechanical properties. Five rings (rolled wire rod having a length corresponding to five laps) were continuously collected from the ring-like rolled wire rod, and each (rolled wire rod having a length corresponding to one lap) of the rings was divided into eight parts, and a total of 40 pieces of rolled wire rods was provided for the test. An average value of the tensile strength was obtained from the tensile test results of the 40 pieces, and the average value was set as tensile strength of the rolled wire rod. In addition, in the maximum value or the minimum value of the test results of the 40 pieces, a value in which a difference with the average value is large was selected, and a difference with the average value was obtained. This difference was set as a variation of the tensile strength in a unit of MPa. A length of a sample in the tensile test was set to 200 mm, and the tensile test was performed under conditions in which a crosshead speed was set to 10 mm/min and a distance between jigs was set to 100 mm.

Next, an evaluation test of the drawability will be described. As preliminary processes of the wire-drawing, the rolled wire rod that was obtained was subjected to a descaling process by pickling, and a lubrication coating treatment by lime coat application without performing spheroidizing annealing, and then a test for drawability was performed. In a drawability evaluation test, each rolled wire rod was collected in a length of 25 m, and was set as a specimen. In addition, wire-drawing was performed using a dry single-head type wire-drawing machine under conditions in which a reduction for one pass was set to 20%, and a wire-drawing speed was set to 50 m/min. Five specimens were prepared for one level, and wire-drawing was performed five times until breaking occurred. An average value of an actual strain ($2 \times \text{Ln}(d/d_0)$) during breaking (here, d: wire size of a drawn wire rod, and $d_0$: wire size of a rolled material) was calculated, and the drawability was evaluated using the average value. With regard to the drawability, a case in which the average value of the actual strain was 2.8 or more was regarded as "pass".

Evaluation results are shown in Tables 1 to 8. In Tables, an underline is drawn with respect to a numerical value that deviates from a range of the present invention. In addition, in Tables, "-" represents non-addition or non-performance. In addition, in Tables, with regard to a structure, "P" represents pearlite. "θ" represents cementite, and "M" represents a supercooled structure.

[Table 1]
[Table 2]
[Table 3]
[Table 4]
[Table 5]
[Table 6]
[Table 7]
[Table 8]

As shown in Tables 1 to 8, in Test Nos. A1 to A13 and B1 to B23 that are examples of the present invention, all of the chemical components, the manufacturing conditions, the metallographic structure, and the mechanical properties accomplished a goal, and as a result, the drawability satisfied a necessary performance.

On the other hand, in Test Nos. A14 to A27 and B24 to B40 that are comparative examples, any of the chemical components, the manufacturing conditions, the metallographic structure, and the mechanical properties did not accomplish the goal, and as a result, the drawability did not satisfy the necessary performance.

A14 is an example in which the C content was excessive, and thus proeutectoid cementite excessively precipitated, and the drawability was not sufficient.

A15 is an example in which the Si content was small, and thus proeutectoid cementite excessively precipitated, and the drawability was not sufficient.

A16 is an example in which the Si content was excessive, and thus the Si-based inclusion excessively precipitated, and the drawability was not sufficient.

A17 is an example in which the Mn content was excessive, and thus a supercooled structure was excessively generated, and the drawability was not sufficient.

A18 is an example in which the Mn content was small, and thus deoxidation was not sufficient, an oxide excessively precipitated, and the drawability was not sufficient.

A19 and A20 are examples in which the Cr content was small, and thus an average size of the pearlite block became coarse, and the drawability was not sufficient.

A21 is an example in which the Cr content was excessive, and thus the supercooled structure was excessively generated, and the drawability was not sufficient.

A22 and A25 are examples in which the Mo content was excessive, and thus the supercooled structure was excessively generated, and the drawability was not sufficient.

A23 and A24 are examples in which the B content was excessive, and thus $Fe_3(CB)_6$ excessively precipitated, and the drawability was not sufficient.

A26 is an example in which the Mo content and the B content were excessive, and thus the supercooled structure was excessively generated, $Fe_3(CB)_6$ excessively precipitated, and the drawability was not sufficient.

A27 is an example in which the C content was small, and thus strength and fatigue properties for bearings as final products were not satisfied.

B24 and B25 are examples in which the starting temperature of finish rolling was high, and thus the average size of the pearlite block deviated from the range of the present invention, and the drawability was not sufficient.

B26 and B29 are examples in which the coiling temperature was high, and thus the area ratio of pearlite and the average size of the pearlite block deviated from the range of the present invention, and the drawability was not sufficient.

B27. B28, and B31 are examples in which the starting temperature of finish rolling and the coiling temperature were high, and thus the area ratio of pearlite, the average size of the pearlite block, and the tensile strength deviated from the range of the present invention, and the drawability was not sufficient.

B30 is an example in which the starting temperature of finish rolling and the coiling temperature were high and the cooling rate was slow, and thus the area ratio of pearlite, the area ratio of proeutectoid cementite, the area ratio of degenerate pearlite, the average size of the pearlite block, and the tensile strength deviated from the range of the present invention, and the drawability was not sufficient.

B32 is an example in which the cooling rate was fast, and thus the area ratio of pearlite, the maximum size of the pearlite block, and the tensile strength deviated from the range of the present invention, and the drawability was not sufficient.

B33 to B35 are examples in which the cooling rate was slow, and thus the area ratio of pearlite, the area ratio of proeutectoid cementite, the area ratio of degenerate pearlite, and the average size of the pearlite block deviated from the range of the present invention, and the drawability was not sufficient.

B36 is an example in which the temperature ratio between the not-dense area and the dense area was large, and thus the maximum size of the pearlite block deviated from the range of the present invention, and the drawability was not sufficient.

B37 is an example in which the starting temperature of finish rolling was low, and thus an abnormal structure was excessively generated, and the drawability was not sufficient.

B38 is an example in which the coiling temperature was low, and thus cracking was generated in the rolled wire rod.

B39 is an example in which the cooling stopping temperature was high, and thus the area ratio of pearlite deviated from the range of the present invention, and the drawability was not sufficient.

B40 is an example in which the cooling stopping temperature was low, and thus the manufacturing cost increased.

Figure 5:
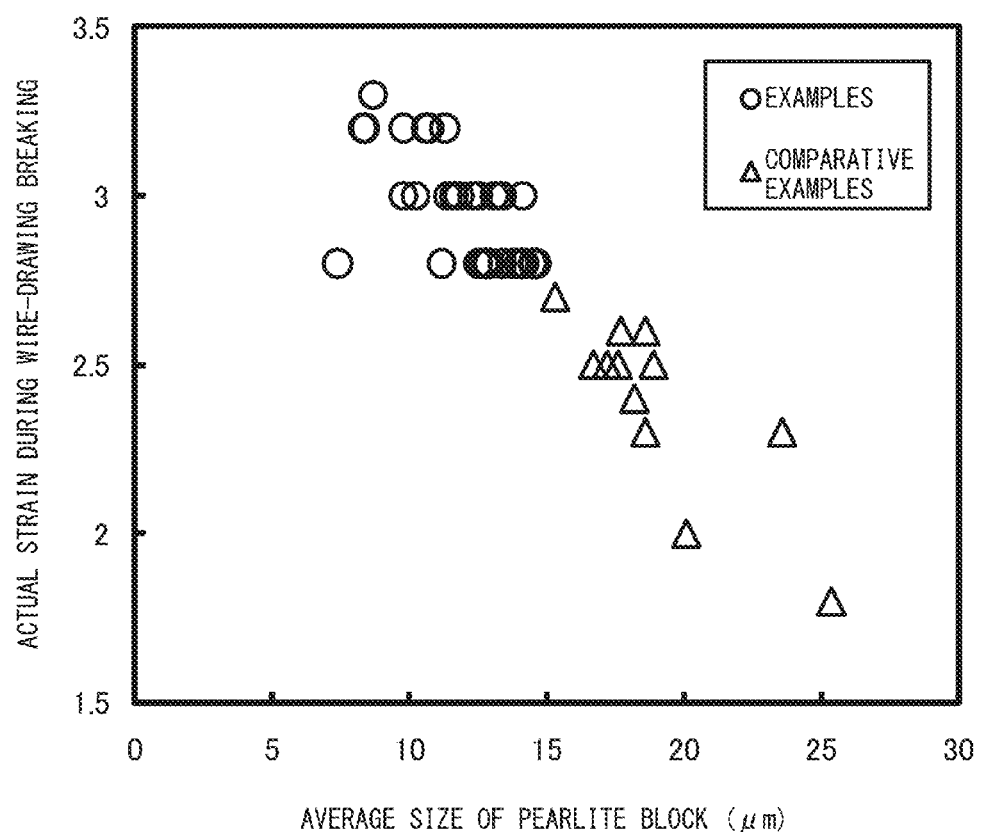
FIG. 5 is a view illustrating a relationship between an average size of a pearlite block and drawability in the high-carbon steel rolled wire rod for bearings according to the embodiment of the present invention.

FIG. 5 illustrates a relationship between the average size of the pearlite block and an actual strain during wire-drawing fracture with regard to Examples of the invention and Comparative Examples in which the average size of the pearlite block deviates from the range of the present invention. When comparing Examples of the invention and Comparative Examples with each other, it can be seen that along with refinement of the average size of the pearlite block, the drawability was improved.

As described above, from the results of Examples, it is obvious that the high-carbon steel rolled wire rod for bearings which is an example of the present invention has excellent drawability.

INDUSTRIAL APPLICABILITY

According to the above-described aspects of the present invention, it is possible to provide a rolled wire rod having excellent drawability in a rolled state by appropriately controlling the size of pearlite block, proeutectoid cementite, degenerate pearlite, and the like. Accordingly, it is possible to omit the spheroidizing heat treatment before the wire-drawing or annealing during wire-drawing which is performed as necessary, and it is possible to realize improvement in productivity, cost reduction, and the like, and thus the industrial applicability is high.

BRIEF DESCRIPTION OF THE REFERENCE SYMBOLS

1: Grain boundary of prior austenite
2: Proeutectoid cementite
3: Pearlite block
4: Pearlite colony
5: Degenerate pearlite
6: Ring-like rolled wire rod
6a: Dense area
6b: Not-dense area

TABLE 1

| | Test No. | Chemical components (mass %) | | | | | | | | Hot Rolling | | | Cooling | | | Re- marks |
| | | C | Si | Mn | Cr | P | S | Mo | B | Wire size after rolling (mm) | Finish rolling temperature (° C.) | coiling coiling temperature (° C.) | Cooling rate (° C./s) | Cooling stopping temperature (° C.) | Temperature ratio between not-dense area and dense area | |
| --- | --- | --- | --- | --- | --- | --- | --- | --- | --- | --- | --- | --- | --- | --- | --- | --- |
| Example of Invention | A1 | 1.01 | 0.25 | 0.30 | 1.36 | 0.007 | 0.005 | — | — | 4.0 | 805 | 798 | 1.1 | 550 | 1.10 | |
| | A2 | 1.05 | 0.15 | 0.30 | 1.40 | 0.008 | 0.004 | — | — | 4.0 | 801 | 801 | 1.1 | 550 | 1.09 | |
| | A3 | 1.00 | 0.20 | 0.50 | 1.10 | 0.008 | 0.005 | 0.03 | — | 4.0 | 804 | 800 | 1.2 | 550 | 1.09 | |
| | A4 | 0.97 | 0.12 | 0.23 | 0.91 | 0.010 | 0.009 | 0.05 | 0.0001 | 4.0 | 798 | 803 | 1.1 | 550 | 1.12 | |
| | A5 | 1.05 | 0.54 | 1.15 | 1.55 | 0.008 | 0.005 | 0.01 | — | 4.0 | 800 | 799 | 1.2 | 550 | 1.14 | |
| | A6 | 0.98 | 0.15 | 0.99 | 1.50 | 0.006 | 0.011 | — | 0.0002 | 4.0 | 796 | 805 | 1.1 | 550 | 1.13 | |
| | A7 | 1.00 | 0.25 | 0.25 | 1.41 | 0.004 | 0.005 | 0.23 | — | 4.0 | 825 | 836 | 0.9 | 550 | 1.08 | |
| | A8 | 1.01 | 0.24 | 0.28 | 1.38 | 0.008 | 0.008 | — | 0.0021 | 4.0 | 778 | 774 | 1.6 | 550 | 1.12 | |
| | A9 | 0.96 | 0.21 | 0.33 | 1.36 | 0.009 | 0.006 | 0.15 | 0.0005 | 4.0 | 803 | 806 | 1.2 | 550 | 1.11 | |
| | A10 | 0.98 | 0.25 | 0.35 | 1.40 | 0.005 | 0.005 | — | 0.0020 | 4.0 | 802 | 802 | 1.3 | 550 | 1.13 | |
| | A11 | 1.09 | 0.25 | 0.30 | 1.36 | 0.007 | 0.005 | — | — | 4.0 | 805 | 798 | 1.1 | 550 | 1.10 | |
| | A12 | 1.01 | 0.25 | 0.30 | 1.36 | 0.019 | 0.005 | — | — | 3.0 | 805 | 798 | 1.1 | 550 | 1.10 | |
| | A13 | 1.01 | 0.25 | 0.30 | 1.36 | 0.007 | 0.020 | — | — | 4.0 | 805 | 798 | 1.1 | 550 | 1.10 | |

TABLE 2

| | Test No. | Chemical components (mass %) | | | | | | | | Hot Rolling | | | Cooling | | | Remarks |
|---|---|---|---|---|---|---|---|---|---|---|---|---|---|---|---|---|
| | | C | Si | Mn | Cr | P | S | Mo | B | Wire size after rolling (mm) | Finish rolling temperature (°C.) | coiling coiling temperature (°C.) | Cooling rate (°C./s) | Cooling stopping temperature (°C.) | Temperature ratio between not-dense area and dense area | |
| Comparative Example | A14 | 1 20 | 0.60 | 0.28 | 1.43 | 0.006 | 0.006 | — | — | 4.0 | 800 | 801 | 1.1 | 550 | 1.10 | |
| | A15 | 1.00 | 0.06 | 0.30 | 1.39 | 0.005 | 0.007 | — | 0.0005 | 4.0 | 810 | 804 | 1.1 | 550 | 1.12 | |
| | A16 | 1.06 | 0.03 | 0.29 | 1.35 | 0.008 | 0.005 | 0.05 | — | 4.0 | 795 | 798 | 2.1 | 550 | 1.12 | |
| | A17 | 0.96 | 0.18 | 1.56 | 0.95 | 0.007 | 0.002 | — | 0.0002 | 4.0 | 800 | 804 | 2.3 | 550 | 1.11 | |
| | A18 | 0.99 | 0.25 | 0.06 | 1.45 | 0.007 | 0.005 | — | 0.0001 | 4.0 | 812 | 806 | 1.1 | 550 | 1.12 | |
| | A19 | 1.05 | 0 35 | 0.35 | 0.80 | 0.008 | 0.004 | — | — | 4.0 | 804 | 800 | 1.1 | 550 | 1.12 | |
| | A20 | 1.05 | 0.25 | 0.36 | 0.20 | 0.006 | 0.006 | — | — | 4.0 | 806 | 800 | 1.2 | 550 | 1.13 | |
| | A21 | 1.05 | 0.50 | 0.23 | 1.63 | 0.011 | 0.008 | — | — | 4.0 | 798 | 802 | 2.0 | 550 | 1.13 | |
| | A22 | 0.96 | 0.25 | 0.34 | 1.40 | 0.006 | 0.010 | 0.38 | — | 4.0 | 812 | 809 | 2.2 | 550 | 1.11 | |
| | A23 | 1.00 | 0.27 | 0.35 | 1.41 | 0.016 | 0.008 | — | 0.0030 | 4.0 | 794 | 801 | 1.8 | 550 | 1.14 | |
| | A24 | 0.98 | 0.28 | 0.64 | 1.35 | 0.004 | 0.006 | 0.20 | 0.0032 | 4.0 | 774 | 775 | 1.2 | 550 | 1.12 | |
| | A25 | 1.03 | 0.41 | 0.51 | 1.51 | 0.005 | 0.005 | 0.42 | 0.0003 | 4.0 | 812 | 815 | 2.3 | 550 | 1.13 | |
| | A26 | 0.99 | 0.32 | 0.34 | 1.16 | 0.006 | 0.006 | 0.51 | 0.0049 | 4.0 | 801 | 806 | 2.3 | 550 | 1.09 | |
| | A27 | 0.93 | 0.26 | 0.32 | 1.39 | 0.008 | 0.008 | — | — | 5.5 | 790 | 824 | 0.9 | 550 | 1.09 | |

TABLE 3

| | Test No. | Chemical components (mass %) | | | | | | | | Hot Rolling | | | Cooling | | | Remarks |
|---|---|---|---|---|---|---|---|---|---|---|---|---|---|---|---|---|
| | | C | Si | Mn | Cr | P | S | Mo | B | Wire size after rolling (mm) | Finish rolling temperature (°C.) | coiling coiling temperature (°C.) | Cooling rate (°C./s) | Cooling stopping temperature (°C.) | Temperature ratio between not-dense area and dense area | |
| Example of Invention | B1 | 1.00 | 0.24 | 0.31 | 1.41 | 0.008 | 0.005 | — | — | 4.0 | 805 | 798 | 1.1 | 550 | 1.12 | |
| | B2 | 0.98 | 0.25 | 0.31 | 1.40 | 0.007 | 0.004 | — | — | 4.0 | 802 | 842 | 0.9 | 550 | 1.10 | |
| | B3 | 1.00 | 0.25 | 0.30 | 1.38 | 0.010 | 0.002 | — | — | 4.0 | 845 | 837 | 1.0 | 550 | 1.11 | |
| | B4 | 1.00 | 0.25 | 0.30 | 1.40 | 0.007 | 0.003 | — | — | 4.0 | 780 | 751 | 1.8 | 550 | 1.12 | |
| | B5 | 1.01 | 0.26 | 0.30 | 1.40 | 0.005 | 0.008 | — | — | 4.0 | 754 | 798 | 2.6 | 550 | 1.14 | |
| | B6 | 1.00 | 0.24 | 0.29 | 1.39 | 0.004 | 0.010 | — | — | 4.0 | 701 | 725 | 0.8 | 550 | 1.09 | |
| | B7 | 1.02 | 0.25 | 0.32 | 1.39 | 0.015 | 0.008 | — | — | 4.0 | 787 | 800 | 2.6 | 550 | 1.12 | |
| | B8 | 0.99 | 0.25 | 0.30 | 1.40 | 0.006 | 0.008 | — | — | 4.0 | 838 | 841 | 2.4 | 550 | 1.13 | |
| | B9 | 1.00 | 0.24 | 0.30 | 1.41 | 0.008 | 0.005 | — | — | 4.0 | 810 | 842 | 0.8 | 550 | 1.09 | |
| | B10 | 1.01 | 0.25 | 0.28 | 1.40 | 0.007 | 0.007 | — | — | 4.0 | 823 | 724 | 1.3 | 550 | 1.13 | |
| | B11 | 1.00 | 0.25 | 0.30 | 1.40 | 0.008 | 0.005 | — | — | 4.0 | 734 | 841 | 0.8 | 550 | 1.08 | |
| | B12 | 0.99 | 0.26 | 0.30 | 1.40 | 0.008 | 0.007 | — | — | 5.0 | 812 | 771 | 1.2 | 550 | 1.09 | |
| | B13 | 1.00 | 0.24 | 0.31 | 1.40 | 0.006 | 0.002 | — | — | 5.0 | 800 | 768 | 1.3 | 550 | 1.16 | |
| | B14 | 0.02 | 0.25 | 0.30 | 1.40 | 0.004 | 0.005 | — | — | 5.0 | 843 | 800 | 0.6 | 550 | 1.10 | |
| | B15 | 1.01 | 0.25 | 0.30 | 1.40 | 0.008 | 0.003 | — | — | 5.0 | 754 | 748 | 2.2 | 550 | 1.10 | |
| | B16 | 1.00 | 0.26 | 0.31 | 1.39 | 0.009 | 0.001 | — | — | 5.0 | 802 | 809 | 1.0 | 550 | 1.09 | |
| | B17 | 1.02 | 0.26 | 0.32 | 1.39 | 0.008 | 0.008 | — | — | 5.5 | 790 | 824 | 0.9 | 550 | 1.09 | |
| | B18 | 0.99 | 0.25 | 0.30 | 1.40 | 0.008 | 0.006 | 0.15 | — | 5.5 | 802 | 834 | 1.1 | 550 | 1.00 | |
| | B19 | 1.01 | 0.25 | 0.32 | 1.39 | 0.007 | 0.004 | 0.10 | — | 5.5 | 834 | 847 | 0.6 | 550 | 1.10 | |
| | B20 | 1.00 | 0.25 | 0.30 | 1.41 | 0.006 | 0.004 | 0.20 | 0.0010 | 5.5 | 778 | 761 | 1.9 | 550 | 1.08 | |
| | B21 | 1.00 | 0.26 | 0.30 | 1.40 | 0.005 | 0.005 | — | 0.0005 | 5.5 | 801 | 830 | 1.4 | 550 | 1.09 | |
| | B22 | 0.99 | 0.25 | 0.30 | 1.41 | 0.011 | 0.006 | — | 0.0015 | 5.5 | 824 | 804 | 0.9 | 550 | 1.10 | |
| | B23 | 1.01 | 0.24 | 0.31 | 1.40 | 0.008 | 0.007 | 0.15 | 0.0020 | 5.5 | 836 | 842 | 0.8 | 550 | 1.07 | |

TABLE 4

| | Test No. | Chemical components (mass %) | | | | | | | | Hot Rolling | | | Cooling | | | Remarks |
|---|---|---|---|---|---|---|---|---|---|---|---|---|---|---|---|---|
| | | C | Si | Mn | Cr | P | S | Mo | B | Wire size after rolling (mm) | Finish rolling temperature (°C.) | coiling coiling temperature (°C.) | Cooling rate (°C./s) | Cooling stopping temperature (°C.) | Temperature ratio between not-dense area and dense area | |
| Comparative Example | B24 | 1.00 | 0.25 | 0.29 | 1.40 | 0.006 | 0.006 | — | — | 4.0 | 902 | 823 | 1.3 | 550 | 1.13 | |
| | B25 | 1.00 | 0.25 | 0.30 | 1.39 | 0.007 | 0.005 | — | — | 5.5 | 898 | 847 | 1.8 | 550 | 1.11 | |
| | B26 | 1.01 | 0.24 | 0.32 | 1.41 | 0.008 | 0.004 | — | — | 4.0 | 826 | 896 | 1.3 | 550 | 1.14 | |
| | B27 | 0.99 | 0.25 | 0.29 | 1.40 | 0.008 | 0.004 | — | — | 4.0 | 904 | 897 | 2.4 | 550 | 1.17 | |
| | B28 | 1.00 | 0.25 | 0.30 | 1.40 | 0.007 | 0.008 | — | — | 5.5 | 950 | 917 | 1.0 | 550 | 1.12 | |

TABLE 4-continued

| Test No. | Chemical components (mass %) | | | | | | | | Hot Rolling | | | Cooling | | | Remarks |
|---|---|---|---|---|---|---|---|---|---|---|---|---|---|---|---|
| | | | | | | | | | Wire size after rolling (mm) | Finish rolling temperature (° C.) | coiling coiling temperature (° C.) | Cooling rate (° C./s) | Cooling stopping temperature (° C.) | Temperature ratio between not-dense area and dense area | |
| | C | Si | Mn | Cr | P | S | Mo | B | | | | | | | |
| B29 | 1.01 | 0.25 | 0.31 | 1.40 | 0.007 | 0.002 | — | — | 5.5 | 780 | 894 | 0.9 | 550 | 1.19 | |
| B30 | 0.99 | 0.24 | 0.30 | 1.40 | 0.008 | 0.015 | — | — | 5.0 | 882 | 894 | 0.4 | 550 | 1.11 | |
| B31 | 0.97 | 0.23 | 0.35 | 1.36 | 0.007 | 0.080 | — | 0.0003 | 4.0 | 857 | 893 | 0.8 | 550 | 1.16 | |
| B32 | 1.01 | 0.24 | 0.30 | 1.41 | 0.009 | 0.006 | 0.20 | — | 4.0 | 836 | 846 | 4.5 | 550 | 1.19 | |
| B33 | 1.00 | 0.25 | 0.30 | 1.39 | 0.008 | 0.008 | — | 0.0005 | 4.0 | 782 | 756 | 0.2 | 550 | 1.13 | |
| B34 | 1.02 | 0.25 | 0.30 | 1.39 | 0.008 | 0.004 | — | 0.0010 | 5.0 | 792 | 798 | 0.3 | 550 | 1.18 | |
| B35 | 1.01 | 0.25 | 0.30 | 1.39 | 0.006 | 0.005 | 0.20 | — | 4.0 | 847 | 849 | 0.1 | 550 | 1.18 | |
| B36 | 1.02 | 0.25 | 0.30 | 1.40 | 0.008 | 0.006 | — | — | 5.5 | 802 | 826 | 1.2 | 550 | 1.22 | |
| B37 | 1.00 | 0.24 | 0.29 | 1.39 | 0.004 | 0.010 | — | — | 4.0 | 680 | 670 | 0.8 | 550 | 1.09 | |
| B38 | 1.00 | 0.24 | 0.29 | 1.39 | 0.004 | 0.010 | — | — | 4.0 | 701 | 640 | — | — | — | Occurrence of Cracking |
| B39 | 0.98 | 0.25 | 0.31 | 1.40 | 0.007 | 0.004 | — | — | 4.0 | 802 | 832 | 0.9 | 670 | 1.10 | |
| B40 | 1.01 | 0.25 | 0.28 | 1.40 | 0.007 | 0.007 | — | — | 4.0 | 823 | 724 | 1.3 | 450 | 1.13 | Increase in manufacturing cost |

TABLE 5

| | Test No. | Structure | Pearlite block | | | Proeutectoid cementite | | Area ratio of degenerate pearlite (%) | Area ration of pearlite (%) | Area ratio of coarse lamellar (%) | Strength TS (MPa) | Strength variation (MPa) | TS1 of upper limit of strength (MPa) | TS1—TS (MPa) | Actual strain during breaking | Remarks |
|---|---|---|---|---|---|---|---|---|---|---|---|---|---|---|---|---|
| | | | Average size (μm) | Maximum size (μm) | Maximum size/average size | Area ratio (%) | Maximum thickness (μm) | | | | | | | | | |
| Example of Invention | A1 | P + θ | 12.5 | 26.4 | 2.1 | 2.4 | 0.4 | 5.2 | 92.4 | 4.5 | 1253 | 45 | 1510 | 257 | 3.0 | |
| | A2 | P + θ | 11.8 | 24.0 | 2.0 | 2.7 | 0.5 | 3.4 | 93.9 | 8.2 | 1287 | −82 | 1514 | 227 | 3.0 | |
| | A3 | P + θ | 13.4 | 22.9 | 1.7 | 1.2 | 0.8 | 4.5 | 94.3 | 1.6 | 1174 | 35 | 1512 | 338 | 2.8 | |
| | A4 | P + θ | 14.6 | 26.0 | 1.8 | 1.3 | 0.7 | 2.1 | 96.6 | 6.2 | 1165 | −43 | 1496 | 331 | 2.8 | |
| | A5 | P + θ | 10.2 | 19.1 | 1.9 | 2.3 | 1.1 | 4.9 | 92.8 | 0.7 | 1341 | −32 | 1535 | 194 | 3.0 | |
| | A6 | P + θ | 10.6 | 20.4 | 1.9 | 0.9 | 0.5 | 0.5 | 98.6 | 6.5 | 1207 | 61 | 1546 | 339 | 3.2 | |
| | A7 | P + θ | 9.8 | 21.5 | 2.2 | 4.1 | 0.9 | 4.6 | 91.3 | 3.4 | 1285 | 49 | 1514 | 229 | 3.2 | |
| | A8 | P + θ | 10.7 | 28.1 | 2.6 | 0.6 | 0.4 | 0.2 | 99.2 | 5.1 | 1236 | 53 | 1547 | 311 | 3.2 | |
| | A9 | P + θ | 8.7 | 24.9 | 2.9 | 1.5 | 0.6 | 2.6 | 95.9 | 2.2 | 1201 | 48 | 1558 | 357 | 3.3 | |
| | A10 | P + θ | 11.3 | 22.8 | 2.0 | 0.3 | 0.4 | 3.5 | 96.2 | 7.8 | 1113 | −49 | 1543 | 430 | 3.2 | |
| | A11 | P + θ | 12.5 | 26.4 | 2.1 | 4.8 | 0.4 | 5.2 | 90.0 | 4.5 | 1253 | 45 | 1473 | 220 | 2.8 | |
| | A12 | P + θ | 12.5 | 26.4 | 2.1 | 2.4 | 0.4 | 5.2 | 92.4 | 4.5 | 1253 | 45 | 1726 | 473 | 3.0 | |
| | A13 | P + θ | 12.5 | 26.4 | 2.1 | 2.4 | 0.4 | 5.2 | 92.4 | 4.5 | 1253 | 45 | 1510 | 257 | 3.0 | |

TABLE 6

| | Test No. | Structure | Pearlite block | | | Proeutectoid cementite | | Area ratio of degenerate pearlite (%) | Area ration of pearlite (%) | Area ratio of coarse lamellar (%) | Strength TS (MPa) | Strength variation (MPa) | TS1 of upper limit of strength (MPa) | TS1—TS (MPa) | Actual strain during breaking | Remarks |
|---|---|---|---|---|---|---|---|---|---|---|---|---|---|---|---|---|
| | | | Average size (μm) | Maximum size (μm) | Maximum size/average size | Area ratio (%) | Maximum thickness (μm) | | | | | | | | | |
| Comparative Example | A14 | P + θ | 11.4 | 21.4 | 1.9 | 7.5 | 1.2 | 2.9 | 89.6 | 8.1 | 1352 | 44 | 1417 | 65 | 2.3 | |
| | A15 | P + θ | 12.5 | 23.6 | 1.9 | 6.1 | 0.7 | 2.4 | 91.5 | 7.2 | 1164 | −52 | 1445 | 281 | 2.0 | |
| | A16 | P + θ | 12.6 | 24.2 | 1.9 | 1.1 | 0.5 | 3.7 | 94.8 | 6.3 | 1310 | −35 | 1523 | 213 | 0.5 | |
| | A17 | P + θ + M | 11.4 | 21.5 | 1.9 | 0.3 | 0.7 | 1.8 | 89.5 | 4.6 | 1384 | −119 | 1542 | 158 | 0.2 | |
| | A18 | P + θ | 14.6 | 32.1 | 2.2 | 1.2 | 0.8 | 4.1 | 94.3 | 4.5 | 1184 | 45 | 1497 | 313 | 1.5 | |
| | A19 | P + θ | 25.4 | 50.9 | 2.0 | 1.5 | 0.6 | 6.4 | 92.1 | 5.0 | 1054 | −41 | 1289 | 235 | 2.1 | |
| | A20 | P + θ | 32.5 | 63.4 | 2.0 | 2.1 | 0.6 | 3.4 | 94.5 | 8.4 | 1036 | 48 | 1041 | 5 | 2.0 | |
| | A21 | P + θ + M | 10.1 | 20.2 | 2.0 | 1.4 | 0.6 | 7.4 | 85.5 | 5.4 | 1374 | 83 | 1546 | 172 | 0.5 | |
| | A22 | P + θ + M | 8.4 | 24.3 | 2.9 | 1.0 | 0.6 | 8.1 | 85.2 | 2.9 | 1402 | 112 | 1565 | 163 | 0.5 | |

TABLE 6-continued

| Test No. | Structure | Pearlite block Average size (μm) | Pearlite block Maximum size (μm) | Pearlite block Maximum size/ average size | Proeutectoid cementite Area ratio (%) | Proeutectoid cementite Maximum thickness (μm) | Area ratio of degenerate pearlite (%) | Area ration of pearlite (%) | Area ratio of coarse lamellar (%) | Strength TS (MPa) | Strength variation (MPa) | TS1 of upper limit of strength (MPa) | TS1—TS (MPa) | Actual strain during breaking | Remarks |
|---|---|---|---|---|---|---|---|---|---|---|---|---|---|---|---|
| A23 | P + θ | 11.2 | 25.1 | 2.2 | 0.6 | 0.4 | 5.8 | 93.2 | 1.6 | 1267 | −61 | 1542 | 275 | 1.5 | |
| A24 | P + θ | 9.4 | 21.9 | 2.3 | 1.0 | 6.6 | 6.4 | 92.1 | 3.1 | 1240 | 61 | 1556 | 316 | 1.2 | |
| A25 | P + θ + M | 10.1 | 20.6 | 2.0 | 1.4 | 0.5 | 2.9 | 89.7 | 6.2 | 1395 | 106 | 1546 | 151 | 0.4 | |
| A26 | P + θ + M | 11.8 | 26.4 | 2.2 | 0.5 | 0.3 | 4.0 | 88.9 | 1.7 | 1437 | −130 | 1537 | 100 | 0.3 | |
| A27 | P + θ | 13.4 | 23.4 | 1.7 | 1.5 | 0.6 | 2.9 | 95.6 | 5.2 | 1085 | 37 | 1284 | 199 | 3.0 | Deficiency in product characteristics |

TABLE 7

| | Test No. | Structure | Pearlite block Average size (μm) | Pearlite block Maximum size (μm) | Pearlite block Maximum size/ average size | Proeutectoid cementite Area ratio (%) | Proeutectoid cementite Maximum thickness (μm) | Area ratio of degenerate pearlite (%) | Area ration of pearlite (%) | Area ratio of coarse lamellar (%) | Strength TS (MPa) | Strength variation (MPa) | TS1 of upper limit of strength (MPa) | TS1—TS (MPa) | Actual strain during breaking | Remarks |
|---|---|---|---|---|---|---|---|---|---|---|---|---|---|---|---|---|
| Example of Invention | B1 | P + θ | 12.3 | 23.3 | 1.9 | 2.0 | 0.6 | 6.2 | 91.8 | 4.0 | 1183 | −67 | 1500 | 317 | 3.0 | |
| | B2 | P + θ | 14.1 | 24.6 | 1.7 | 3.2 | 1.6 | 5.4 | 91.4 | 6.4 | 1246 | 51 | 1439 | 193 | 2.8 | |
| | B3 | P + θ | 13.8 | 31.0 | 2.2 | 2.9 | 0.8 | 3.7 | 93.4 | 2.5 | 1206 | 46 | 1463 | 257 | 2.8 | |
| | B4 | P + θ | 8.4 | 19.4 | 2.3 | 1.2 | 0.9 | 2.9 | 95.9 | 6.2 | 1570 | 30 | 1570 | 291 | 3.2 | |
| | B5 | P + θ | 7.4 | 17.6 | 2.4 | 0.9 | 0.8 | 4.5 | 94.6 | 3.7 | 1315 | 164 | 1579 | 264 | 2.8 | |
| | B6 | P + θ | 11.4 | 24.0 | 2.1 | 3.8 | 0.8 | 3.6 | 92.6 | 4.3 | 1164 | 50 | 1442 | 278 | 3.0 | |
| | B7 | P + θ | 11.2 | 18.3 | 1.6 | 0.8 | 0.6 | 1.2 | 98.0 | 5.7 | 1337 | −154 | 1568 | 231 | 2.8 | |
| | B8 | P + θ | 12.9 | 26.8 | 2.1 | 1.0 | 0.9 | 0.9 | 98.1 | 8.1 | 1352 | −163 | 1550 | 198 | 2.8 | |
| | B9 | P + θ | 14.2 | 28.5 | 2.0 | 3.7 | 1.6 | 3.4 | 92.9 | 1.4 | 1136 | 85 | 1424 | 288 | 2.8 | |
| | B10 | P + θ | 11.6 | 20.6 | 1.8 | 1.9 | 0.7 | 2.1 | 96.0 | 6.3 | 1263 | 40 | 1527 | 264 | 3.0 | |
| | B11 | P + θ | 14.0 | 26.6 | 1.9 | 3.8 | 1.6 | 2.6 | 93.6 | 5.9 | 1185 | 64 | 1424 | 239 | 2.8 | |
| | B12 | P + θ | 13.1 | 26.4 | 2.0 | 3.1 | 1.0 | 1.9 | 95.0 | 6.4 | 1269 | −45 | 1301 | 32 | 3.0 | |
| | B13 | P + θ | 12.8 | 30.1 | 2.4 | 3.0 | 1.0 | 3.5 | 93.5 | 6.4 | 1243 | −174 | 1302 | 59 | 2.8 | |
| | B14 | P + θ | 14.5 | 28.1 | 1.9 | 4.1 | 1.2 | 5.4 | 90.5 | 3.6 | 1135 | 98 | 1223 | 88 | 2.8 | |
| | B15 | P + θ | 8.3 | 25.4 | 3.1 | 2.4 | 0.8 | 2.6 | 95.0 | 6.3 | 1271 | 51 | 1363 | 92 | 3.2 | |
| | B16 | P + θ | 12.5 | 26.7 | 2.1 | 2.6 | 0.9 | 3.7 | 93.7 | 4.3 | 1159 | −42 | 1320 | 161 | 3.0 | |
| | B17 | P + θ | 13.4 | 23.4 | 1.7 | 1.5 | 0.6 | 2.9 | 95.6 | 5.2 | 1120 | 37 | 1284 | 164 | 3.0 | |
| | B18 | P + θ | 14.1 | 29.7 | 2.1 | 1.3 | 0.7 | 2.5 | 96.2 | 4.4 | 1206 | 51 | 1285 | 79 | 3.0 | |
| | B19 | P + θ | 14.6 | 32.5 | 2.2 | 1.4 | 1.8 | 4.6 | 94.0 | 10.5 | 1195 | −152 | 1269 | 74 | 2.8 | |
| | B20 | P + θ | 9.8 | 23.7 | 2.4 | 2.1 | 1.0 | 1.0 | 96.9 | 3.1 | 1151 | 45 | 1299 | 148 | 3.0 | |
| | B21 | P + θ | 12.7 | 27.2 | 2.1 | 3.2 | 0.8 | 3.4 | 93.4 | 2.7 | 1134 | 64 | 1222 | 88 | 2.8 | |
| | B22 | P + θ | 13.3 | 24.1 | 1.8 | 3.0 | 0.8 | 4.5 | 92.5 | 5.6 | 1167 | 51 | 1221 | 54 | 3.0 | |
| | B23 | P + θ | 13.8 | 24.0 | 1.7 | 2.8 | 1.6 | 6.4 | 90.8 | 6.8 | 1194 | −116 | 1216 | 22 | 2.8 | |

TABLE 8

| | Test No. | Structure | Pearlite block Average size (μm) | Pearlite block Maximum size (μm) | Pearlite block Maximum size/ average size | Proeutectoid cementite Area ratio (%) | Proeutectoid cementite Maximum thickness (μm) | Area ratio of degenerate pearlite (%) | Area ration of pearlite (%) | Area ratio of coarse lamellar (%) | Strength TS (MPa) | Strength variation (MPa) | TS1 of upper limit of strength (MPa) | TS1—TS (MPa) | Actual strain during breaking | Remarks |
|---|---|---|---|---|---|---|---|---|---|---|---|---|---|---|---|---|
| Comparative Example | B24 | P + θ | 18.9 | 28.6 | 1.5 | 0.9 | 0.7 | 7.1 | 92.0 | 6.5 | 1306 | −119 | 1461 | 155 | 2.5 | |
| | B25 | P + θ | 18.6 | 29.1 | 1.6 | 1.0 | 1.6 | 5.0 | 94.0 | 5.8 | 1167 | 126 | 1234 | 67 | 2.5 | |
| | B26 | P + θ | 17.6 | 37.6 | 2.1 | 4.8 | 1.6 | 5.4 | 89.8 | 6.8 | 1156 | 105 | 1317 | 161 | 2.5 | |
| | B27 | P + θ | 18.2 | 42.1 | 2.3 | 4.3 | 0.9 | 5.9 | 89.8 | 9.8 | 1354 | −163 | 1336 | −18 | 2.4 | |
| | B28 | P + θ | 20.1 | 37.4 | 1.9 | 4.5 | 1.6 | 5.6 | 89.9 | 4.9 | 1206 | 143 | 1063 | −143 | 2.0 | |
| | B29 | P + θ | 17.2 | 48.4 | 2.8 | 4.7 | 1.6 | 8.4 | 86.9 | 9.5 | 1063 | 173 | 1071 | 8 | 2.5 | |

TABLE 8-continued

| Test No. | Structure | Pearlite block Average size (μm) | Pearlite block Maximum size (μm) | Pearlite block Maximum size/average size | Proeutectoid cementite Area ratio (%) | Proeutectoid cementite Maximum thickness (μm) | Area ratio of degenerate pearlite (%) | Area ration of pearlite (%) | Area ratio of coarse lamellar (%) | Strength TS (MPa) | Strength variation (MPa) | TS1 of upper limit of strength (MPa) | TS1—TS (MPa) | Actual strain during breaking | Remarks |
|---|---|---|---|---|---|---|---|---|---|---|---|---|---|---|---|
| B30 | P + θ | 25.4 | 51.5 | 2.0 | 7.5 | 1.8 | 10.9 | 81.6 | 6.5 | 1053 | −94 | 766 | −287 | 1.8 | |
| B31 | P + θ | 23.6 | 42.5 | 1.8 | 4.3 | 1.6 | 5.8 | 89.9 | 6.2 | 1265 | −156 | 1257 | −8 | 2.3 | |
| B32 | P + θ +M | 7.3 | 30.3 | 4.2 | 0.3 | 1.1 | 8.4 | 89.6 | 9.5 | 1578 | −165 | 1573 | −5 | 1.8 | |
| B33 | P + θ | 17.7 | 26.4 | 1.5 | 6.2 | 1.4 | 12.1 | 81.7 | 8.2 | 1134 | 42 | 1166 | 32 | 2.6 | |
| B34 | P + θ | 16.7 | 35.6 | 2.1 | 6.5 | 1.2 | 11.3 | 82.2 | 9.1 | 987 | 162 | 992 | 5 | 2.5 | |
| B35 | P + θ | 18.6 | 30.5 | 1.6 | 6.8 | 1.7 | 15.4 | 77.8 | 10.6 | 1060 | −158 | 1063 | 3 | 2.6 | |
| B36 | P + θ | 12.1 | 57.6 | 4.8 | 1.9 | 0.8 | 4.5 | 93.6 | 9.5 | 1198 | −198 | 1275 | 77 | 2.7 | |
| B37 | P + θ | 11.4 | 24.0 | 2.1 | 3.8 | 0.8 | 3.6 | 89.5 | 4.3 | 1164 | 50 | 1442 | 278 | 2.5 | |
| B38 | P + θ | — | — | — | — | — | — | — | — | — | — | — | — | — | Occurrence of Cracking |
| B39 | P + θ +M | 14.1 | 24.6 | 1.7 | 3.2 | 1.0 | 5.4 | 87.6 | 9.4 | 1246 | 75 | 1439 | 193 | 2.4 | |
| B40 | P + θ | 11.6 | 20.6 | 1.8 | 1.9 | 0.7 | 2.1 | 96.0 | 6.3 | 1263 | 40 | 1527 | 264 | 3.0 | Increase in manufacturing cost |

The invention claimed is:

1. A rolled wire rod comprising, as a chemical component, by mass %:
   C: 0.95% to 1.10%;
   Si: 0.10% to 0.70%;
   Mn: 0.20% to 1.20%; and
   Cr: 0.90% to 1.60%,
   the balance consisting of Fe and unavoidable impurities,
   wherein a metallographic structure of the rolled wire rod includes, by an area ratio, 90% to 100% of pearlite, 0% to 5% of proeutectoid cementite, and 0% to 10% of degenerate pearlite having granular cementite,
   an average size of a pearlite block of the pearlite is 1.0 μm to 15 μm and a maximum size of the pearlite block is 1 to 4 times the average size, and
   wherein a tensile strength of the rolled wire rod in a unit of MPa is equal to or less than a TS 1 of an upper limit of a strength shown in the following Expression 1:

$$TS1=1500\times(1-0.5\times\ln(D_0/5.5))-150\times\exp(d_p/15-1)-120\times(\exp(A_\theta/5)-1)-80\times\exp(A_p'/10-1)$$ (Expression 1)

wherein,
   $D_0$ represents a wire size of the rolled wire rod in a unit of mm,
   $d_p$ represents the average size of the pearlite block in a unit of μm,
   $A_\theta$ represents an area ratio of the proeutectoid cementite in a unit of %, and
   $A_p'$ represents an area ratio of the degenerate pearlite in a unit of %.

2. The rolled wire rod according to claim 1,
   wherein the chemical component further includes, by mass %, any one kind or both kinds of,
   Mo: more than 0% and equal to or less than 0.25%, and
   B: more than 0% and equal to or less than 0.0025%.

3. The rolled wire rod according to claim 1,
   wherein a maximum value of a size perpendicular to a longitudinal direction of the proeutectoid cementite is 1.5 μm or less.

4. The rolled wire rod according to claim 1,
   wherein when a radius of the rolled wire rod in a cross section perpendicular to the longitudinal direction is set to r in a unit of mm, on an inner side of a region surrounded by ½ r from the center of the cross section, a coarse lamellar in which a lamellar spacing is 0.5 μm or more is 0% to 10% in the pearlite by an area ratio.

5. The rolled wire rod according to claim 1,
   wherein a variation in the tensile strength of the rolled wire rod is in a range of −150 MPa to +150 MPa with the average value of the tensile strength set as a reference.

6. A method of manufacturing a rolled wire rod, the method comprising:
   a finish rolling process of shaping a rolled wire rod by using steel having the chemical component according to claim 1 at a starting temperature of a finish rolling set to 700° C. to 850° C.;
   a coiling process of coiling the rolled wire rod in a ring shape at a coiling temperature set to 650° C. to 850° C. after the shaping of the rolled wire rod; and
   a cooling process of cooling the rolled wire rod to a temperature range of 500° C. to 600° C. at a cooling rate of 0.5° C./sec to 3° C./sec after the coiling of the rolled wire rod,
   wherein when a temperature of a not-dense area at which ring overlapping of the rolled wire rod during the cooling of the rolled wire rod is less is set to Tn in a unit of ° C., and a temperature of a dense area at which the ring overlapping is much is set to Td, Td/Tn<1.20 is satisfied.

7. The rolled wire rod according to claim 2,
   wherein a maximum value of a size perpendicular to a longitudinal direction of the proeutectoid cementite is 1.5 μm or less.

8. The rolled wire rod according to claim 2,
   wherein when a radius of the rolled wire rod in a cross section perpendicular to the longitudinal direction is set to r in a unit of mm, on an inner side of a region surrounded by ½ r from the center of the cross section, a coarse lamellar in which a lamellar spacing is 0.5 μm or more is 0% to 10% in the pearlite by an area ratio.

9. The rolled wire rod according to claim 2,
wherein a variation in the tensile strength of the rolled wire rod is in a range of −150 MPa to +150 MPa with the average value of the tensile strength set as a reference.

10. A method of manufacturing a rolled wire rod, the method comprising:
a finish rolling process of shaping a rolled wire rod by using steel having the chemical component according to claim 2 at a starting temperature of a finish rolling set to 700° C. to 850° C.;
a coiling process of coiling the rolled wire rod in a ring shape at a coiling temperature set to 650° C. to 850° C. after the shaping of the rolled wire rod; and
a cooling process of cooling the rolled wire rod to a temperature range of 500° C. to 600° C. at a cooling rate of 0.5° C./sec to 3° C./sec after the coiling of the rolled wire rod,
wherein when a temperature of a not-dense area at which ring overlapping of the rolled wire rod during the cooling of the rolled wire rod is less is set to Tn in a unit of ° C., and a temperature of a dense area at which the ring overlapping is much is set to Td, Td/Tn<1.20 is satisfied.

11. The rolled wire rod according to claim 3,
wherein when a radius of the rolled wire rod in a cross section perpendicular to the longitudinal direction is set to r in a unit of mm, on an inner side of a region surrounded by ½ r from the center of the cross section, a coarse lamellar in which a lamellar spacing is 0.5 μm or more is 0% to 10% in the pearlite by an area ratio.

12. The rolled wire rod according to claim 3,
wherein a variation in the tensile strength of the rolled wire rod is in a range of −150 MpA to +150 MPa with the average value of the tensile strength set as a reference.

13. The rolled wire rod according to claim 4,
wherein a variation in the tensile strength of the rolled wire rod is in a range of −150 MPa to +150 MPa with the average value of the tensile strength set as a reference.

* * * * *